(12) United States Patent
Ghessassi

(10) Patent No.: US 11,445,432 B2
(45) Date of Patent: Sep. 13, 2022

(54) METROPOLITAN AREA MESH NETWORK WITH ADAPTIVE LOAD-BALANCED NODES

(71) Applicant: Charter Communications Operating, LLC, St. Louis, MO (US)

(72) Inventor: Karim Ghessassi, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/988,630

(22) Filed: Aug. 8, 2020

(65) Prior Publication Data

US 2022/0046521 A1   Feb. 10, 2022

(51) Int. Cl.
*H04W 48/16* (2009.01)
*H04W 4/02* (2018.01)
*H04W 76/15* (2018.01)

(52) U.S. Cl.
CPC .......... *H04W 48/16* (2013.01); *H04W 4/027* (2013.01); *H04W 76/15* (2018.02)

(58) Field of Classification Search
CPC ...... H04W 48/16; H04W 76/15; H04W 4/027
USPC ....................................................... 455/434
See application file for complete search history.

(56) References Cited

U.S. PATENT DOCUMENTS 9,351,224 B2 * 5/2016 Zhou ..................... H04W 36/32
2016/0302143 A1 * 10/2016 Karlsson ........... H04W 28/0268

* cited by examiner

*Primary Examiner* — Joel Ajayi
(74) *Attorney, Agent, or Firm* — Straub & Straub; Michael P. Straub; Stephen T. Straub

(57) ABSTRACT

Methods and apparatus for supporting wireless networks, e.g., mesh networks, which are well suited for use in metropolitan areas are described. In various embodiments, vehicle based communications systems are used to support a mesh network. A communications device, e.g., vehicle's WiFi communications system, scans for access points and selects between available access points based on, e.g., speed and/or direction of the vehicle in which the communications device is located and, when available, information about the speed, direction and/or route of the access point to which the communications device is considering attaching. Access points are prioritized based on the QOS they can support and/or the amount of time that they are likely to be in communications range. Traffic load can be split between multiple access points. Client devices can also act as access points with respect to other devices allowing for a dense mesh network to be formed.

20 Claims, 20 Drawing Sheets

| FIGURE 3A |
| FIGURE 3B |

800

ASSEMBLY OF COMPONENTS, E.G. FOR DETERMINING IF A CONNECTION IS LIKELY TO BE LOST IN THE NEAR FUTURE
(INCLUDED IN A COMMUNICATIONS DEVICE, E.G., A FIRST COMMUNICATIONS DEVICE WHICH IS A MOBILE COMMUNICATIONS DEVICE SUPPORTING CELLULAR COMMUNICATIONS, WIFI COMMUNICATIONS, AND MESH NETWORK FUNCTIONALITY)

COMPONENT CONFIGURED TO COMPARE A VELOCITY VECTOR FOR FIRST COMMUNICATIONS DEVICE WITH A VELOCITY VECTOR FOR AN AP TO DETERMINE IF THE TWO VELOCITY VECTORS DIFFERS BY A PREDETERMINED AMOUNT IN SPEED OR DIRECTION, E.G. BY 30% — 804

COMPONENT CONFIGURED TO DETERMINE IF THE COMPARISON OF VELOCITY VECTORS, WHICH WERE COMPARED, DIFFER BY AT LEAST SAID PREDETERMINED AMOUNT IN SPEED OR DIRECTION, AND TO CONTROL OPERATION AS A FUNCTION OF THE DETERMINATION — 806

COMPONENT CONFIGURED TO DETERMINE IF THE AVAILABLE PATH OR ROUTE INFORMATION OF THE AP WHEN COMPARED TO THE PATH OR ROUTE INFORMATION OF THE FIRST COMMUNICATIONS DEVICE INDICATES A DIFFERENCE IN PATHS/ROUTES (E.G., A TURN BY ONE DEVICE AND NOT BY THE OTHER) LIKELY TO RESULT IN A LOSS OF CONNECTION AND TO CONTROL OPERATION AS A FUNCTION OF THE DETERMINATION — 808

COMPONENT CONFIGURED TO DETERMINE IF AN IMPENDING DISCONNECTION SIGNAL WAS RECEIVED FROM AN AP, E.G., BECAUSE THE AP IS GOING TO SHUT DOWN, E.G., DUE TO BEING PARKED WITH THE ENGINE OFF, AND TO CONTROL OPERATION AS A FUNCTION OF THE DETERMINATION — 810

COMPONENT CONFIGURED TO RETURN THAT A LOSS OF CONNECTION IS LIKELY IN THE NEAR FUTURE — 812

COMPONENT CONFIGURED TO RETURN THAT A LOSS OF CONNECTION IS NOT LIKELY IN THE NEAR FUTURE — 814

FIGURE 8

METROPOLITAN AREA MESH NETWORK WITH ADAPTIVE LOAD-BALANCED NODES

FIELD

The present invention relates to wireless communication methods and apparatus, and more particularly, to method and apparatus for increasing coverage and capacity using mesh networks.

BACKGROUND

As the number of connected devices, especially connected wireless devices, grows, so does the need for increased bandwidth and coverage in out-of-home networks. While there are currently a number of approaches to provide quality connectivity to devices, these approaches tend to require comprehensive coverage. Comprehensive coverage comes at a high cost since this requires the installation, hardware acquisition and potentially, licensing of restricted bands which could run into billions of dollars. Furthermore, even with costs aside, there is always the issue with high demand during peak hours only. This means, the network operator is forced to invest heavily into a network with high capacity which might not be used at full capacity for 24 hours. Furthermore, any out-of-home wireless network requires continuous expansion to cover dead-spots or new areas where users would be present. There is a continuous race to 'follow' the users wherever they may be, but the installation cost and time cannot keep pace.

Based on the above discussion there is a need for new method and apparatus for increasing wireless coverage and/or capacity. It would be beneficial if these new method and apparatus did not require large capital investments in infrastructure or require additional licensing of restricted bands.

SUMMARY

Methods and apparatus for supporting wireless networks, e.g., mesh networks, which are well suited for use in metropolitan areas are described. In various embodiments, vehicle based communications systems are used to support a mesh network. Thus as more vehicles come into proximity to one another the amount of hardware is effectively increased as the communications load in an area is also likely to increase due to the presence of more vehicles and/or individuals in the area. In various embodiments a communications device, e.g., vehicle's WiFi communications system, scans for access points in an area and selects between the available access points based on, e.g., speed and direction of the vehicle in which the communications device is located and, when available, information about the speed, direction and/or route of the access point to which the communications device is considering attaching. Access points are prioritized based on the QoS they can support and/or the amount of time that they are likely to be in communications range. The communications device then connects to one or more access points. Traffic load can be split between multiple access points with changes in load between access points as QoS of the connection to an access point changes and/or a connection is lost with an access point. Bi-directional communications is supported with the one or more access points to which attachments are made. While explained in the context of an exemplary WiFi based system other wireless communications technologies including, e.g., Bluetooth and/or other wireless technologies could be used to implement the devices, e.g., APs, and mesh network.

In at least some cases when the communications device is stationary, stationary access points are prioritized over moving access points since the stationary access point is expected to stay within communication range as long at the communications device remains stationary. However, in cases where both the communications device and potential access points to which it might attach are moving, a moving access point moving in the same general speed and direction as the communications device is likely to be, and often will be, prioritized over a stationary access point, since it is likely to remain in range as the devices move in the same direction for a period of time, while the stationary access point will move out of range over time due to the communications device's movement. The angle of direction of the communications device and access point are often taken into consideration when prioritizing access points. Direction of travel information and/or upcoming turns are communicated via message sent between devices in some cases. This allows a client device to establish a new connection and/or perform a new load balancing operation before a connection is lost due to an upcoming turn to can in direction of an access point.

A device which is selected as an access point may have a wireless connection to another device in the network, e.g., vehicle communications system and/or a connection to a cellular network.

The methods and apparatus are generally described in the context of one communications device acting as a client (also sometimes referred to as a slave) making decisions as to which access points (sometimes referred to as masters) it will connect to and use over time; it should be appreciated that since each communications device acts in some embodiments as a node in a mesh network, the same device can, and often does. appear as an available access point to other devices in the network.

By using vehicle communications systems, e.g., WiFi systems of cars and/or other devices, to support a mesh network, overall connectivity to other devices can be enhanced as compared to systems which attempt to rely on fixed access points to support communications at little additional cost since many modern cars and many other vehicles come equipped with WiFi and/or cellular communications' devices. By using the mesh network implemented in accordance with the invention connectivity to fixed and/or cellular networks can be supported but potentially without all the traffic having to be communicated over such networks for the full communications path between communicating devices and, in some cases, without the communications having to traverse a cellular network at all.

An exemplary method of operating a first communications device, in accordance with some embodiments, comprises: scanning, at the first communications device, for wireless networks; identifying at the first communications device, one or more available access points based on wireless network identifiers received during said scanning, said identified access points including a first access point; and prioritizing, at the first communications device, individual identified access points, said step prioritizing individual access points including prioritizing the first access point based on signal strength of a signal received from the first access point and one or more of: i) whether the first access point is a fixed or mobile wireless access point or ii) first access point motion information.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows.

BRIEF DESCRIPTION OF THE FIGURES

FIG. 2 comprises the combination of FIG. 2A, FIG. 2B, FIG. 2C and FIG. 2D.

FIG. 6B is a second part of a drawing of an exemplary assembly of components which may be included in a communications device, e.g., the communications device of FIG. 5, to implement an exemplary method of operating the communications device, e.g. the method of the flowchart of FIG. 2.

FIG. 8 is a drawing of an exemplary assembly of components which may be included in a communications device, e.g., to implement a method of determining if a connection with an access point is likely to be lost in the near future, e.g., the method of the flowchart of FIG. 4.

DETAILED DESCRIPTION

Figure 1:
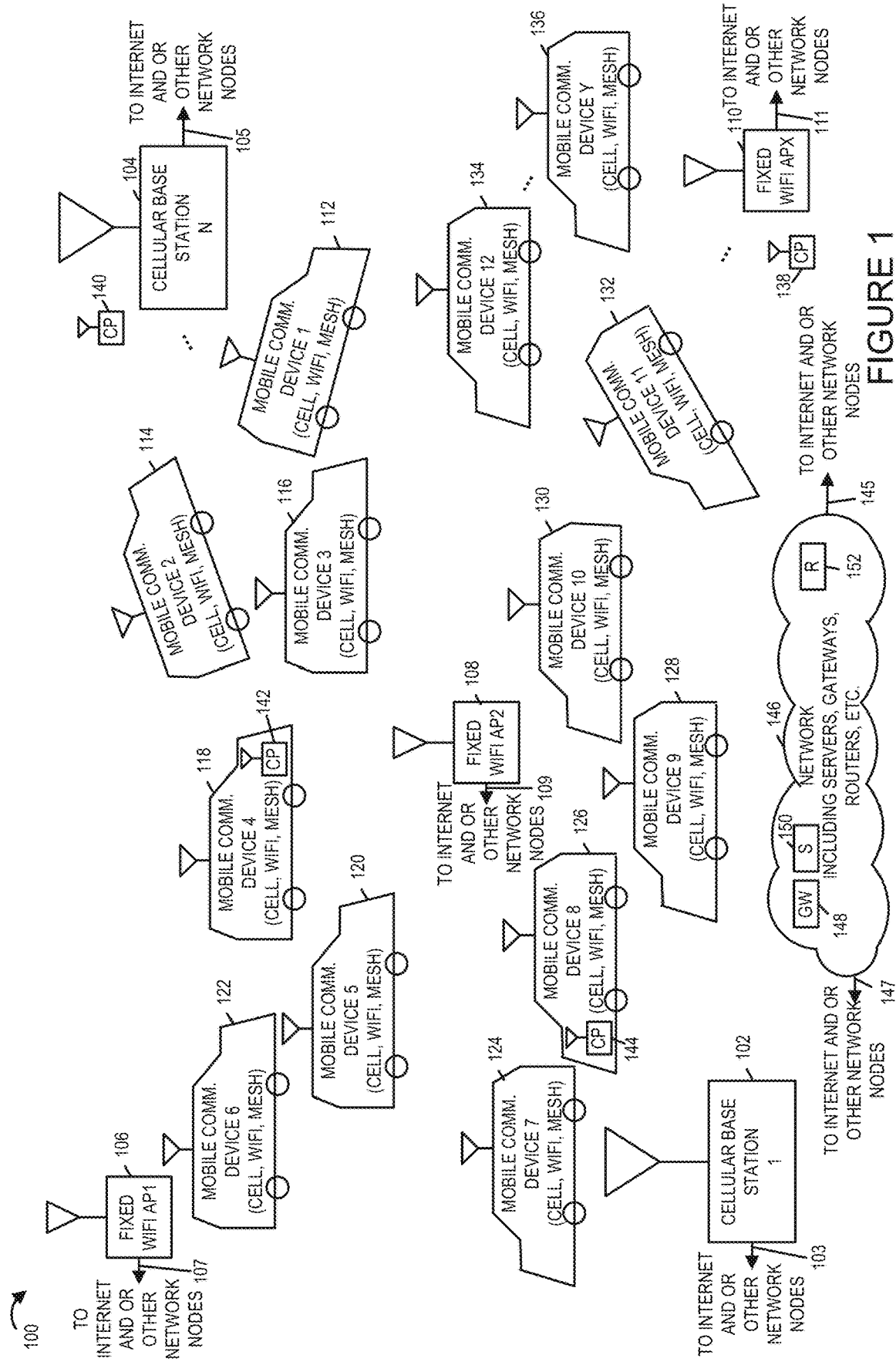
FIG. 1 is a drawing of an exemplary communications system supporting mesh networks in accordance with an exemplary embodiment.
Figure 2A:
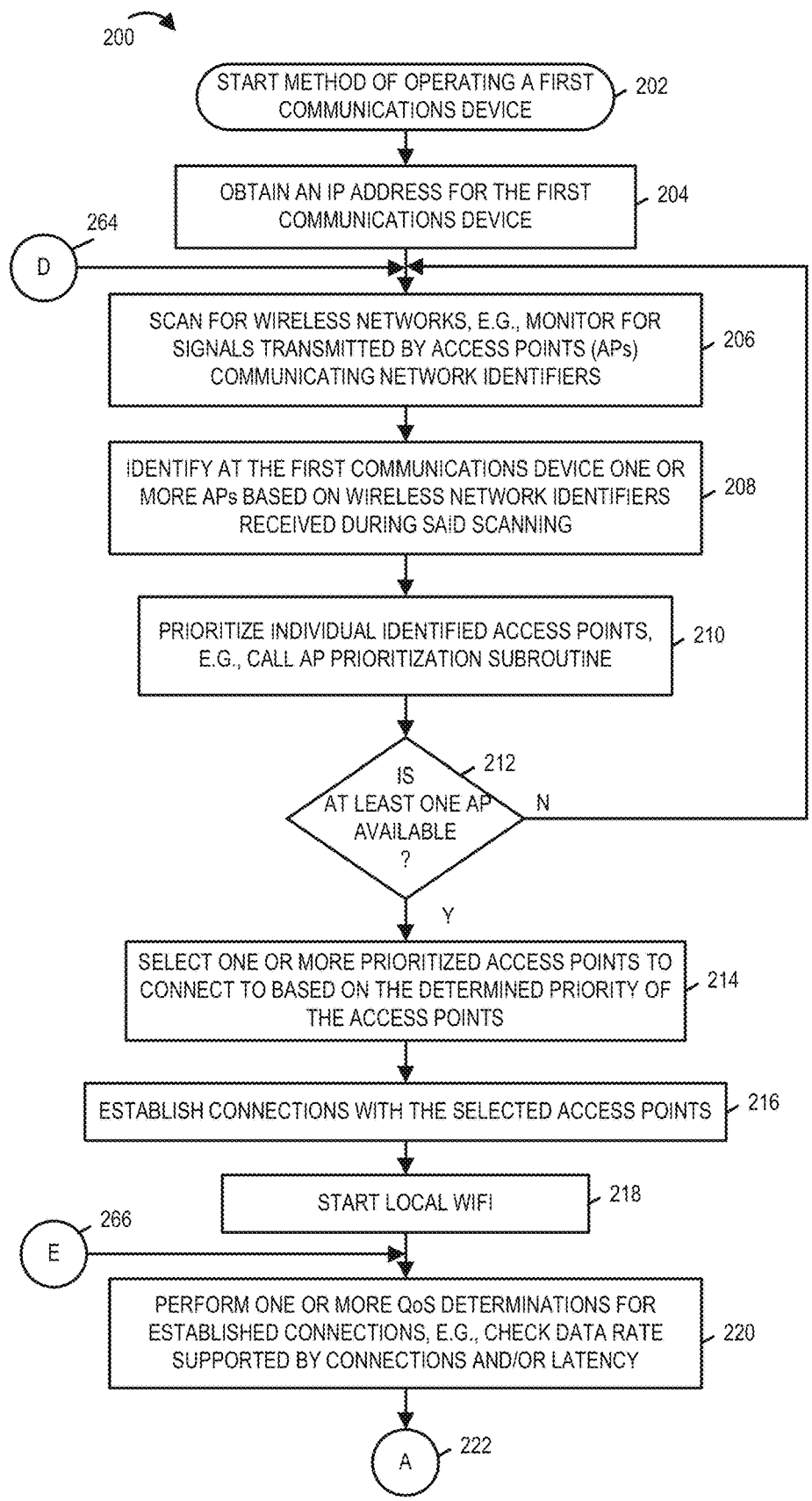
FIG. 2A is a first part of a flowchart of an exemplary method of operating a first mobile communications device, supporting cellular communications, WiFi communications, and mesh network functionality, in accordance with an exemplary embodiment.
Figure 2B:
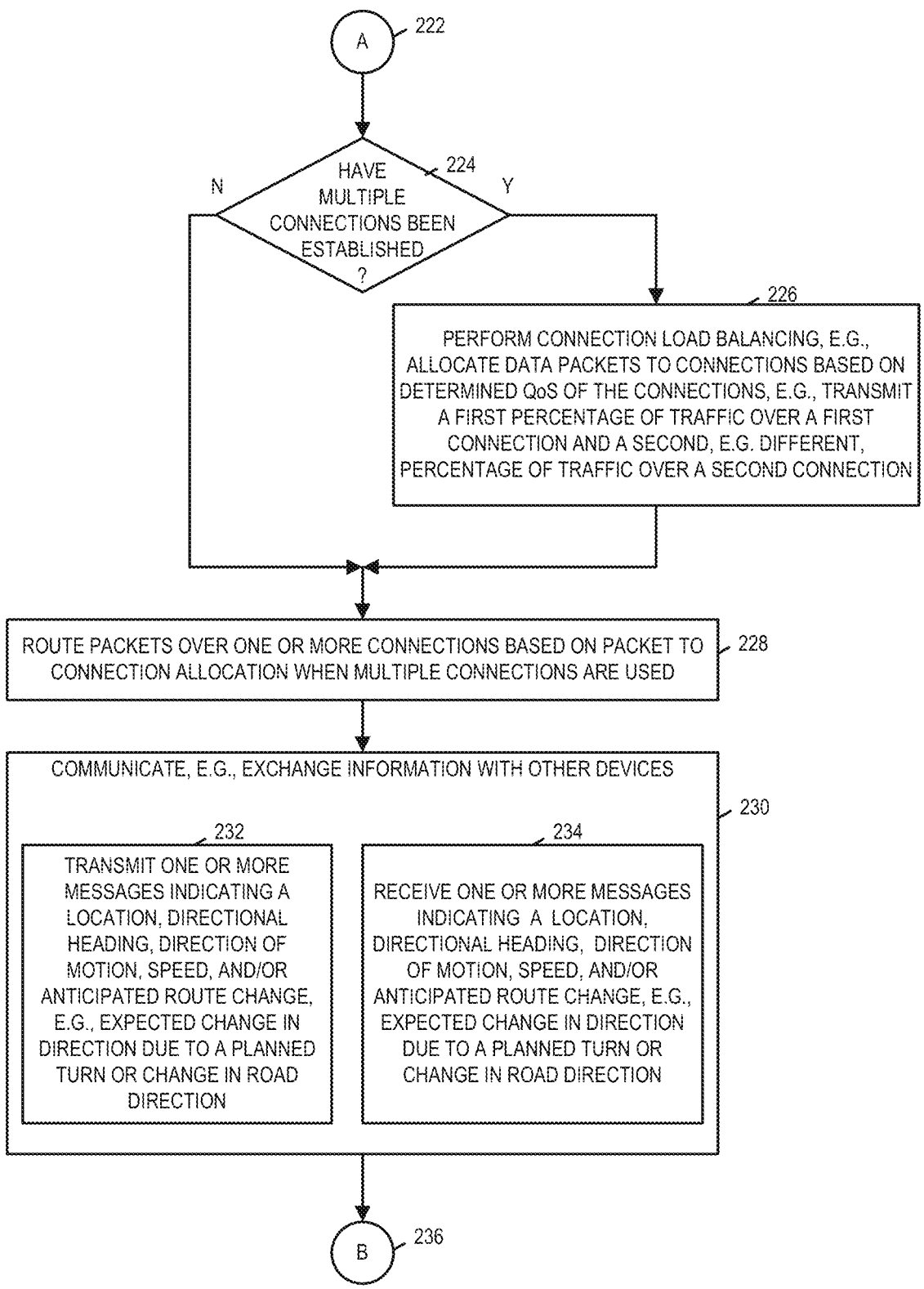
FIG. 2B is a second part of a flowchart of an exemplary method of operating a first mobile communications device, supporting cellular communications, WiFi communications, and mesh network functionality, in accordance with an exemplary embodiment.
Figure 2C:
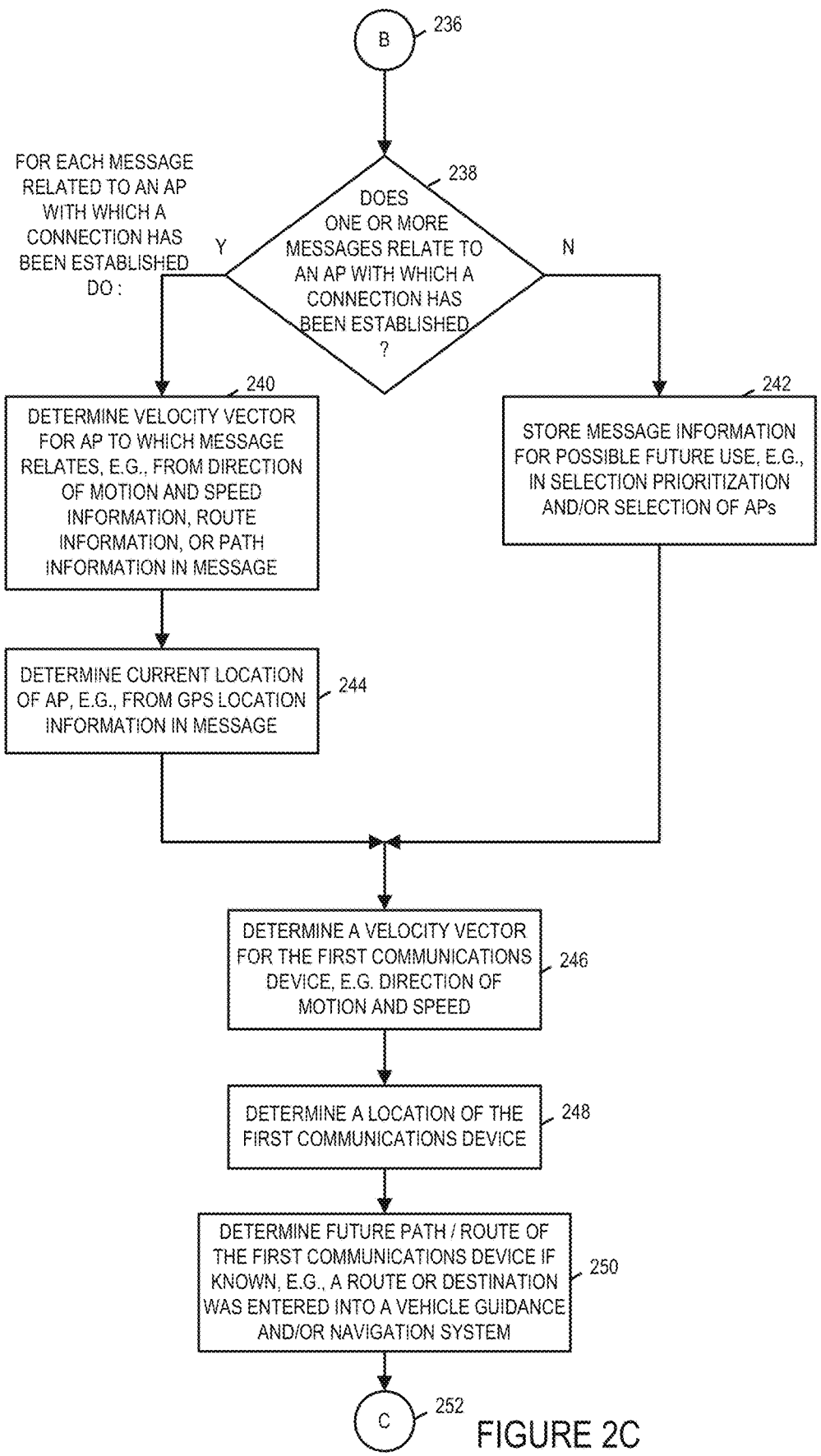
FIG. 2C is a third part of a flowchart of an exemplary method of operating a first mobile communications device, supporting cellular communications, WiFi communications, and mesh network functionality, in accordance with an exemplary embodiment.
Figure 2D:
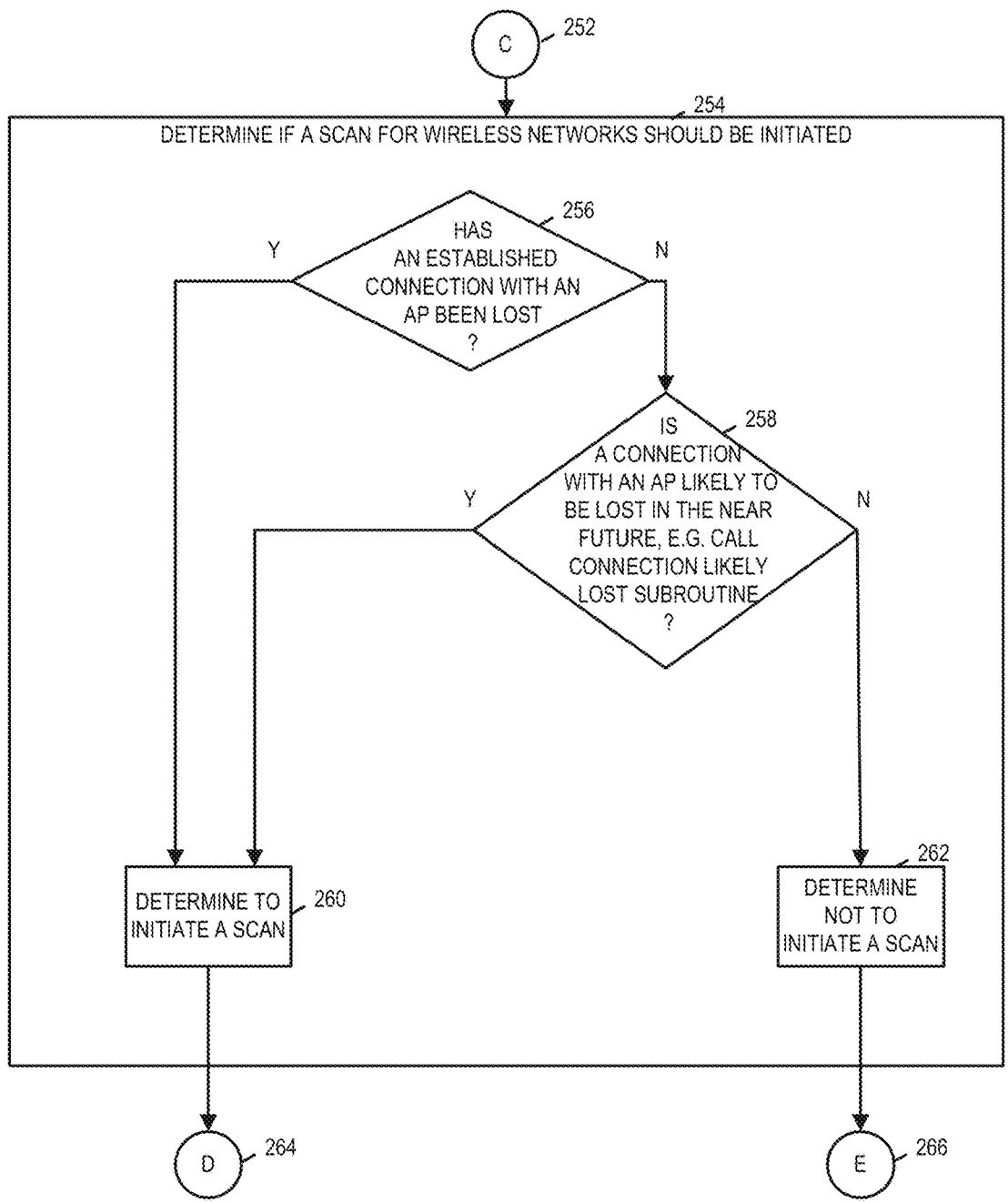
FIG. 2D is a fourth part of a flowchart of an exemplary method of operating a first mobile communications device, supporting cellular communications, WiFi communications, and mesh network functionality, in accordance with an exemplary embodiment.

FIG. 1 is a drawing of an exemplary communications system 100 in accordance with an exemplary embodiment.

Exemplary communications system 100 includes a plurality of cellular base stations (cell base station 1 102, . . . , cell base station N 104), a plurality of fixed WiFi access points (fixed WiFi AP 1 106, fixed WiFi AP 2 108, . . . , fixed WiFi AP X 110), a plurality of mobile communications devices supporting cellular communications, WiFi communications, and mesh network functionality in accordance with the present invention (mobile communications device 1 112, mobile communications device 2 114, mobile communications device 3 116, mobile communications device 4 118, mobile communications device 5 120, mobile communications device 6 122, mobile communications device 7 124, mobile communications device 8 126, mobile communications device 9 128, mobile communications device 10 130, mobile communications device 11 132, mobile communications device 12 134, mobile communications device Y 136), and a plurality of cell phones supporting cellular and WiFi communications (138, 140, 142, 144). Exemplary communications system 100 further includes a network 146 including servers 150, gateways 148 and routers 152. Cellular base station 1 102 is coupled to the Internet and/or or other network nodes via communications link 103, e.g. a wired or fiber optic cable. Cellular base station N 104 is coupled to the Internet and/or or other network nodes via communications link 105, e.g. a wired or fiber optic cable. Fixed WiFi AP1 106 is coupled to the Internet and/or or other network nodes via communications link 107, e.g. a wired or fiber optic cable. Fixed WiFi AP2 108 is coupled to the Internet and/or or other network nodes via communications link 109, e.g. a wired or fiber optic cable. Fixed WiFi APX 110 is coupled to the Internet and/or or other network nodes via communications link 111, e.g. a wired or fiber optic cable.

Cell phone 138, which is in the vicinity of fixed WiFi AP1 138 is, e.g. coupled to fixed WiFAP1 via a wireless communications link. Cellphone 140, which is in the vicinity of cell base station N 104 is, e.g. coupled to cell base station N 104 via a wireless communications link. Cellphone 142, e.g., a cellphone of a passenger in vehicle 118 is, e.g., coupled to a local WiFi network AP within vehicle 118. Cellphone 142, e.g., a cellphone of a passenger in vehicle 126 is, e.g., coupled to a local WiFi network AP within vehicle 126.

Figure 9:
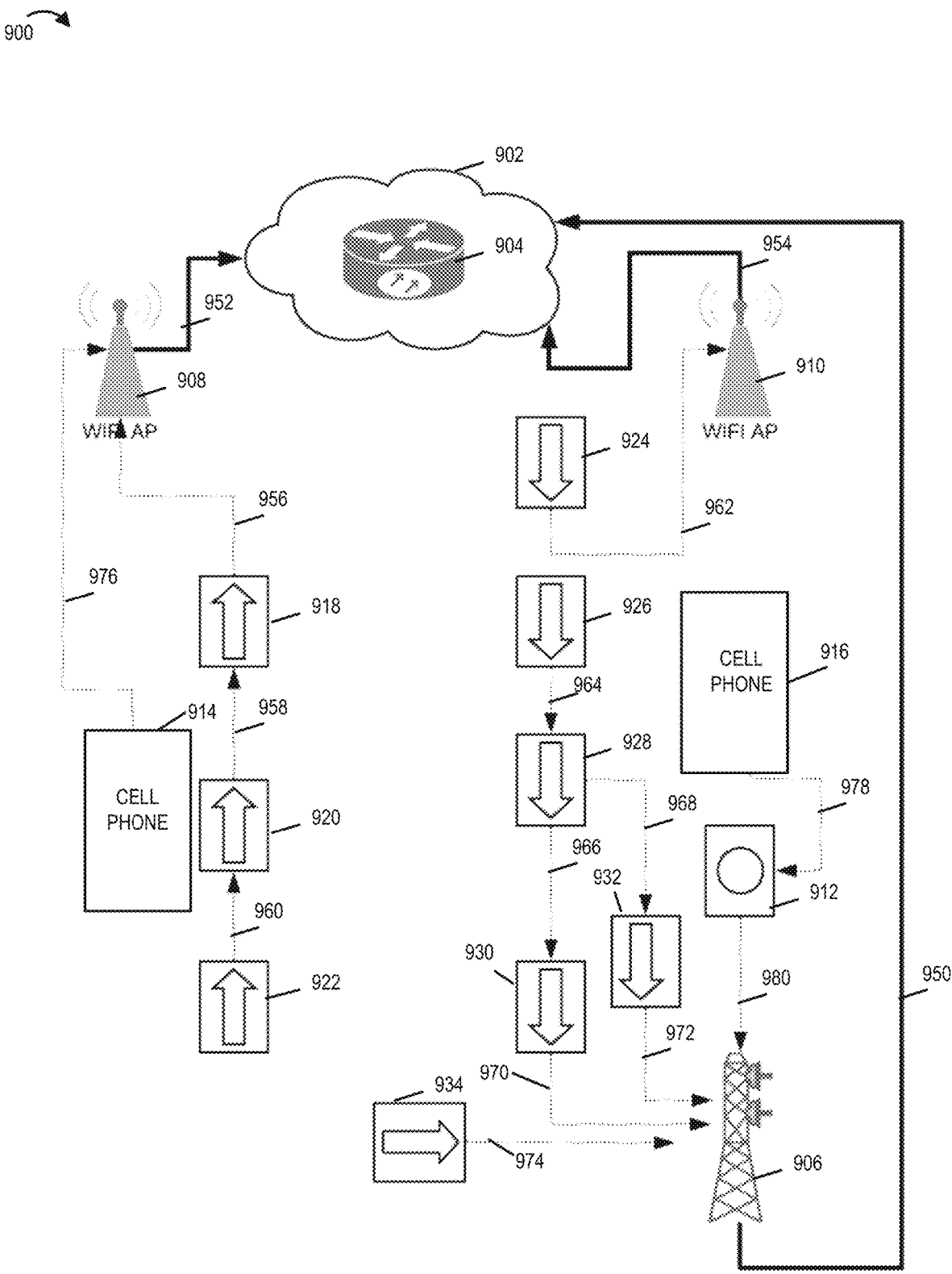
FIG. 9 is a drawing of an exemplary system including a mesh network in accordance with an exemplary embodiment.

Each of the mobile communications devices (112, 114, 116, 118, 120, 122, 124, 126, 128, 130, 132, 134, 136) may be, and sometimes is connected to a cellular base station, a fixed location access point and/or one or more different ones of mobile communications devices (112, 114, 116, 118, 120, 122, 124, 126, 128, 130, 132, 134, 136), serving as a mesh network access point. Each of the mobile communications devices (112, 114, 116, 118, 120, 122, 124, 126, 128, 130, 132, 134, 136), may, and sometimes does act as an AP for other mobile communications devices in the mesh network and may, and sometimes does, act as a client device with regard to other mobile communications devices. FIG. 9 illustrates an example in which exemplary mobile communications devices supporting cellular communications, WiFi communications, and mesh network functionality are shown coupled to particular other mobile communications devices (as part of the mesh network), cell base stations and/or fixed WiFi APs. Various factors are taken into consideration with regard to establishing, prioritizing and/or maintaining connections between mobile wireless communications devices with regard to the mesh network included: received signal strength, QoS information, proximity between a pair of mobile communications devices, similarity of velocity vectors between a pair of mobile communications devices in both speed and direction, similarity of routes/paths being followed or planned to follow between a pair of mobile communications devices, current status mobile communications devices, e.g. in motion, stationary for at least a predetermined period of time, e.g., 5 minutes, or stationary for a time not exceeding the predetermined period of time, e.g. a momentary stop due to traffic or a light.

FIG. 2, comprising the combination of FIG. 2A, FIG. 2B, FIG. 2C and FIG. 2D, is a flowchart 200 of an exemplary method of operating a first communications device in accordance with an exemplary embodiment. Operation starts in step 202, in which the first communications device is powered on and initialized. Operation proceeds from start step 202 to step 204.

In step 204, the first communications device obtains an IP address for the first communications device. Operation proceeds from step 204 to step 206.

In step 206, the first communications device scans for wireless networks, e.g. monitors for signals transmitted by access points (APs) communicating network identifiers (e.g., checks received signals for network identifiers such as ESSIDs transmitted by wireless access points). Operation proceeds from step 206 to step 208. In step 208 the first communications device, identifies, at the first communications device, one or more APs based on wireless network identifiers (e.g., Extended Service Set Identifiers (ESSIDs)) received during said scanning, said identified access points including a first access point.

ESSID stands for Extended Service Set Identification, which basically means the identifying name of the wireless network akin to a radio station "call sign" if you will. The ESSID is an electronic marker or identifier that serves as an identification and address for your computer, or network device to connect to a wireless router or access point and then access the internet. The settings can be either broadcast enabled (open) or broadcast disabled (closed).

A similar security protocol is WPA2 which stands for Wi-Fi Protected Access 2, which serves as a lock and key mechanism which comes in three strengths, none (weakest), 64 bit encryption, and 128 bit encryption (which is the strongest). To illustrate, think of ESSID as the street address on the front door of a home, and WPA2 as the door lock and Skeleton key. An Open wireless network can be a very serious problem, especially with the broadcast range of most modern routers at or close to 100 yards, any person with a knowledge of wireless networks and a wireless enabled laptop can easily find their way onto a vulnerable network and gain access to sensitive files, documents, and even steal identities And since most wireless routers are set to open network by default, open networks are more common than not.

Operation proceeds from step 208 to step 210. In step 210 the first communications device prioritizes individual identified access points, e.g. the first communications device calls an AP prioritization routine which performs prioritization and returns a prioritized list of APs. In some embodiments AP prioritization routine 300 of FIG. 3 is called. An exemplary AP prioritization subroutine will now be described.

Figure 3A:
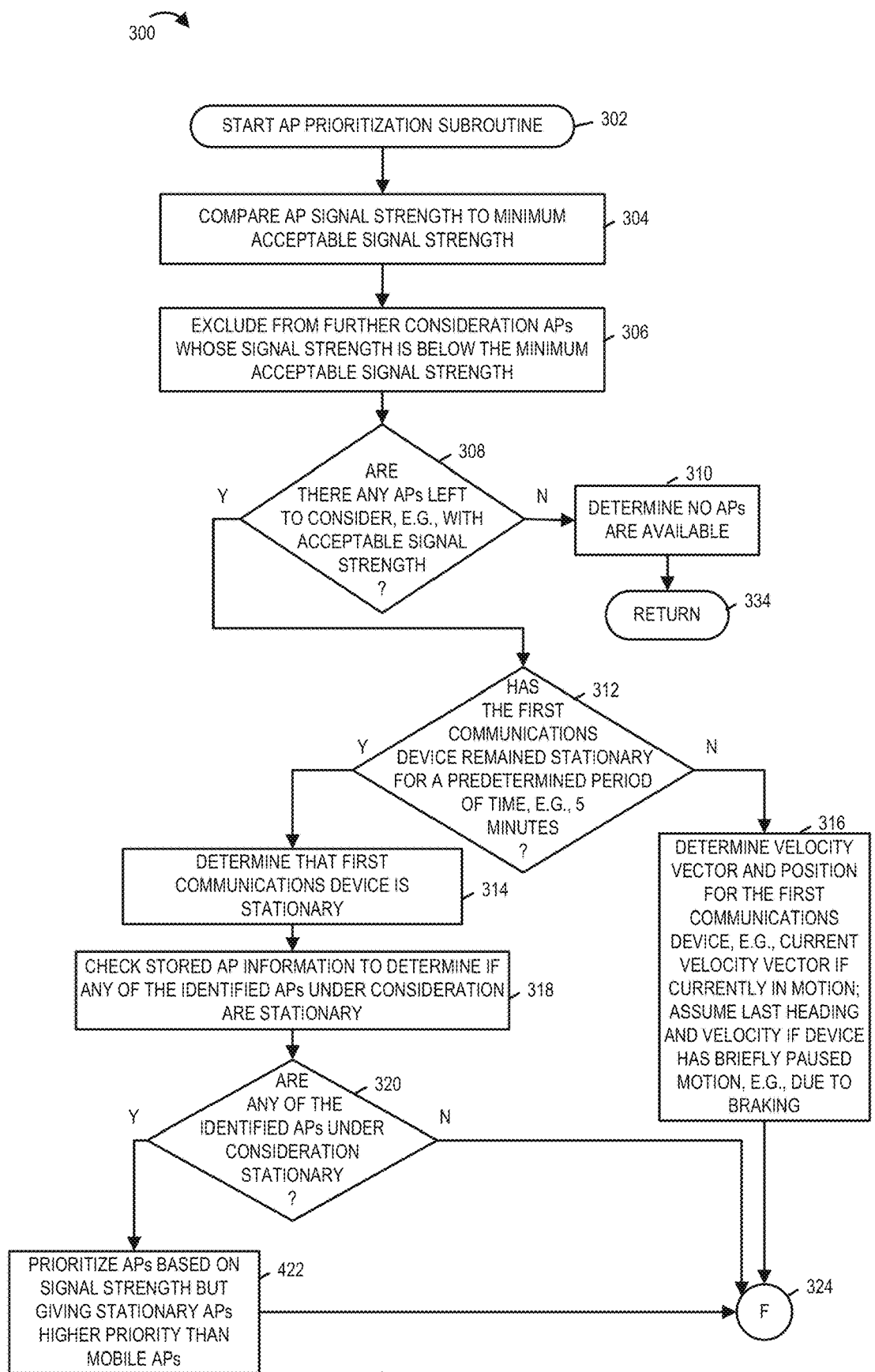
FIG. 3A is a first part of a flowchart of an exemplary access point (AP) prioritization subroutine in accordance with an exemplary embodiment.
Figures 3, 3B:
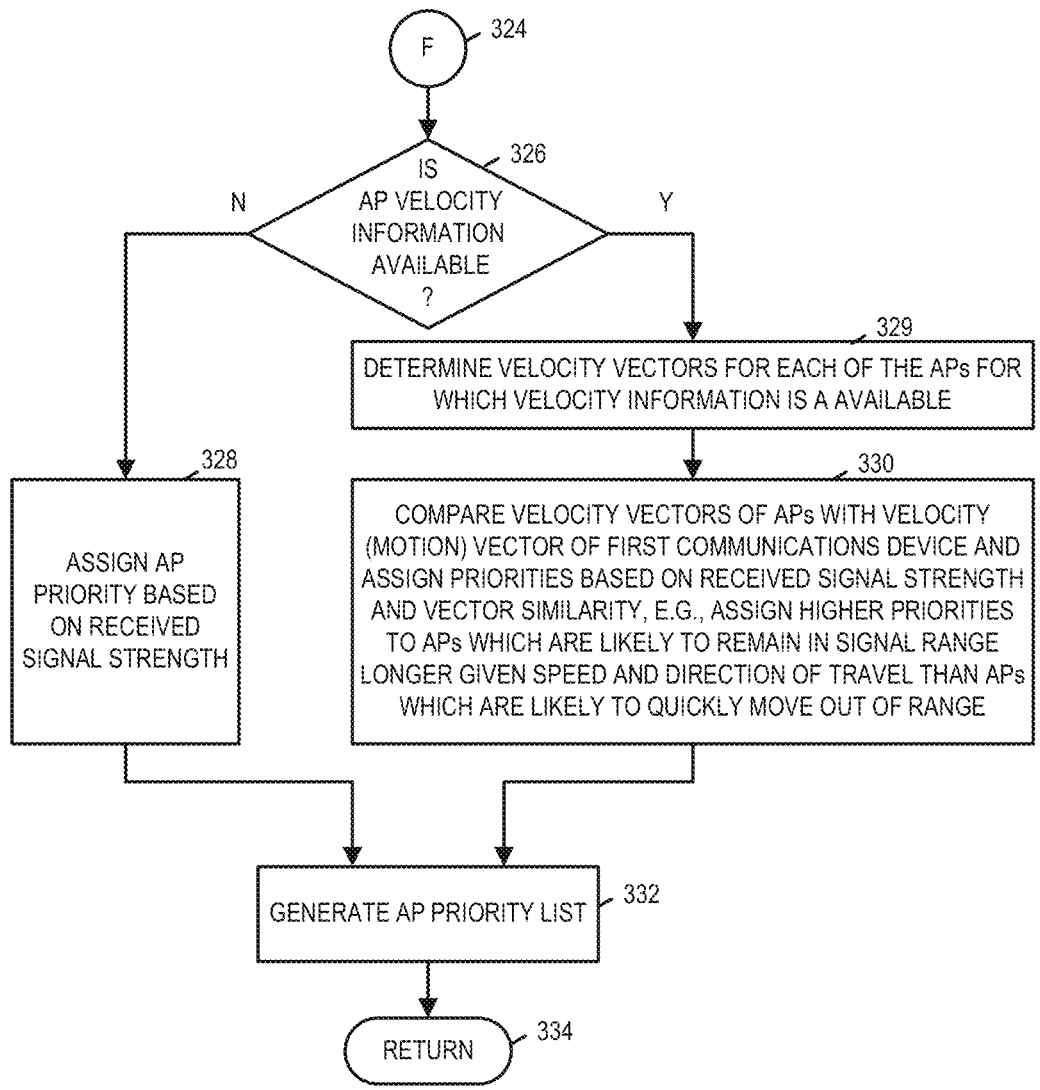
FIG. 3B is a second part of a flowchart of an exemplary access point (AP) prioritization subroutine in accordance with an exemplary embodiment.
FIG. 3 comprises the combination of FIG. 3A and FIG. 3B.

FIG. 3, comprising the combination of FIG. 3A and FIG. 3B, is a flowchart 300 of an exemplary method of prioritizing APs in accordance with an exemplary embodiment. The prioritization routine starts in step 302, and operation proceeds to step 304.

In step 304, the first communications device compares AP signal strength to minimum acceptable signal strength. Operation proceeds from step 304 to step 306 in which the AP excludes from further consideration APs whose signal strength is below the minimum acceptable signal strength. Operation proceeds from step 306 to step 308.

In step 308 the first communications device determines if there are any APs left to consider, e.g., are there any APs left with acceptable signal strength. If there are not any APs left to consider, then operation proceeds from step 308 to step 310 in which the first communications device determines that no APs are currently available. Operation proceeds from step 310 to return step 334. However, if step 308 determines if there are any APs left to consider, then operation proceeds from step 308 to step 312. In step 312 the first communications device determines if the first communications device has remained stationary for a period of time, e.g., 5 minutes. If the determination of step 312 is that the first communications device has remained stationary for the predetermined period of time, then operation proceeds from step 312 to step 314 in which the first communications device determines that the first communications device is operating as a stationary device. However, if the determination of step 312 is that the first communications device has not remained stationary for the predetermined period of time, then operation proceeds from step 312 to step 316 in which the first communications device determines a velocity vector and position for the first communications device, e.g., determine current velocity vector if the first communications device is in motion; determine a velocity vector assuming last heading (last direction of motion) and a prior velocity (e.g., include an average speed during a previous window of motion or a previous steady state speed prior to the short cessation in motion) if the device has briefly paused motion, e.g. due to braking. Operation proceeds from step 316, via connecting node F 324 to step 326.

Returning to step 314, operation proceeds from step 314 to step 318 in which the first communications device checks if any of the identified APs under consideration are stationary. If the determination of step 320 is that any of the identified APs under consideration are stationary, then operation proceeds from step 320 to step 322, in which the first communications device prioritized the identified APs under consideration based on signal strength, but giving stationary APs higher priority than mobile APs. Operation proceeds from step 322, via connecting node F 426 to step 426. Returning to step 320, if the determination of step 320 is that none of the identified APs under consideration are stationary, then operation proceeds from step 320, via connecting node F 324 to step 326.

In step 326 the first communications device determines if AP velocity information is available. If no AP velocity information is available, then operation proceeds from step 326 to step 328, in which the first communications device assigns AP priority based on received signal strength. However, if in step 436 the first communications device determines that AP velocity information is available, then operation proceeds from step 326 to step 329 in which the first communications device determines velocity vectors for each of the APs for which velocity information is available. Operation proceeds from step 329 to step 330. In step 330 the first communications device compares velocity vectors of APs with a velocity vector (motion vector) of the first communication device and assigns priorities based on received signal strength and vector similarity, e.g. assign higher priorities to APs which are likely to remain in signal range longer given speed or direction of travel than APs which are likely to quickly move out of range.

Operation proceeds from 328 or step 330 to step 332, in which the first communication device generates an AP priority list. Operation proceeds from step 332 to return step 334, which returns operation to step 210. Operation proceeds from step 210 to step 212.

In step 212 the first communications device determines if there is at least one AP available, e.g., based on the returned results of the AP prioritization subroutine 300. If there is not at least one AP available, then operation proceeds from step 212 to step 206 for another scan for wireless networks. However, if there is at least one AP available, then operation proceeds from step 212 to step 214.

In step 214 the first communications device selects one or more prioritized access points to connect to based on the determined priority of the access points. Operation proceeds from step 214 to step 216, in which the first communications device establishes connections with the selected access points. Operation proceeds, in some embodiments, from step 216 to optional step 218, in which the first communications device starts a local WiFi. Operation proceeds from step 218 to step 220.

In step 220 the first communications device performs one more Quality of Service (QoS) determinations for established connections, e.g., checks data rate supported by connections and/or latency. Operation proceeds from step 220, via connecting node A 222, to step 224. In step 224, the first communications device determines if multiple connections have been established. If multiple connections have not been established then operation proceeds from step 224 to step 228. However, if multiple connections have been established, then operation proceeds from step 224 to step 226 in which the first communications device performs connection load balancing, e.g. allocates data packets to connections based on determined QoS of the connections, e.g. transmits a first percentage of the traffic over a first connection and second, e.g. different percentage of the traffic over a second connection. Operation proceeds from step 226 to step 228.

In step 228 the first communications device routes packets over one or more connections based on packet to connection allocation when multiple connections are used. Operation proceeds from step 228 to step 230.

In step 230 the first communications device communicates, e.g. exchanges information with other devices. Step 230 includes one or both of steps 232 and 234. In step 232 the first communications device transmits one or more messages indicating a location, directional heading, direction of motion, speed and/or anticipated route change, e.g. expected change in direction due to a planned turn or change in road direction. In various embodiments, one or more messages transmitted in step 232 communicate information about the first communications device. In step 234 the first communications devices receives one or more messages indicating a location, directional heading, direction of motion, speed and/or anticipated route change, e.g., expected change in direction due to a planed turn of change in road direction. In various embodiments, one or more messages received in step 234 communicate information about an access point. Operation proceeds from step 230, via connecting node B 236, to step 238. In step 238, the first communications device determines if one or more of the received messages relates to an AP with which a connection has been established. If one or more of the received messages relates to an AP with which a connection has been established, then, for each message or set of messages related to an AP with which a connection has been established, operation proceeds from step 238 to step 240. In step 240 the first communications device determines a velocity vector for the AP to which the message relates, e.g. from direction of motion and speed information, route information or path information in the message. Operation proceeds from step 240 to step 244, in which the first communications device determines a current location of the AP, e.g. from GPS location information in the message.

However, if step 238 determines that none of the received messages relates to an AP with which a connection has been established, then, operation proceeds from step 238 to step 242, in which the first communications device stores message information for possible future use, e.g., in selection prioritization and/or in selection of APs. Operation proceeds from step 242 or step 244 to step 246.

In step 246 the first communications device determines a velocity vector for the first communications device, e.g., a direction of motion and speed of the first communications device. Operation proceeds from step 246 to step 248, in which the first communications device determines a location of the first communications, e.g. based on received GPS signals, inertial information (gyro and/or accelerometer measurements), other received signals, e.g. received signals used for triangulation, and/or user input. Operation proceeds from step 248 to step 250.

In step 250 the first communications device determines a future path/route of the first communications device if known, e.g. a route or destination was entered into a vehicle guidance and/or navigation system. Operation proceeds from step 250, via connecting node C 252, to step 254.

In step 254 the first communications device determines if a scan for wireless networks should be initiated. Step 254 includes steps 256, 258, 260 and 262. In step 256 the first communications device determines if a connection with an AP has been lost. If the determination of step 256 is that an established connection with an AP has been lost, then operation proceeds from step 256 to step 260, in which the first communications device determines to initiate a scan. However, if the determination of step 256 is that an established connection with an AP has not been lost, then operation proceeds from step 256 to step 258. In step 258 the first communications device determines if an established connection with an AP is likely to be lost in the near future, e.g., within a few seconds or less than a minute. For example, in some embodiments, step 258 calls connection likely lost subroutine 400 in step 258, e.g., for each AP corresponding to a connection. An exemplary connection likely to be lost in the near future subroutine will now be described.

Figure 4:
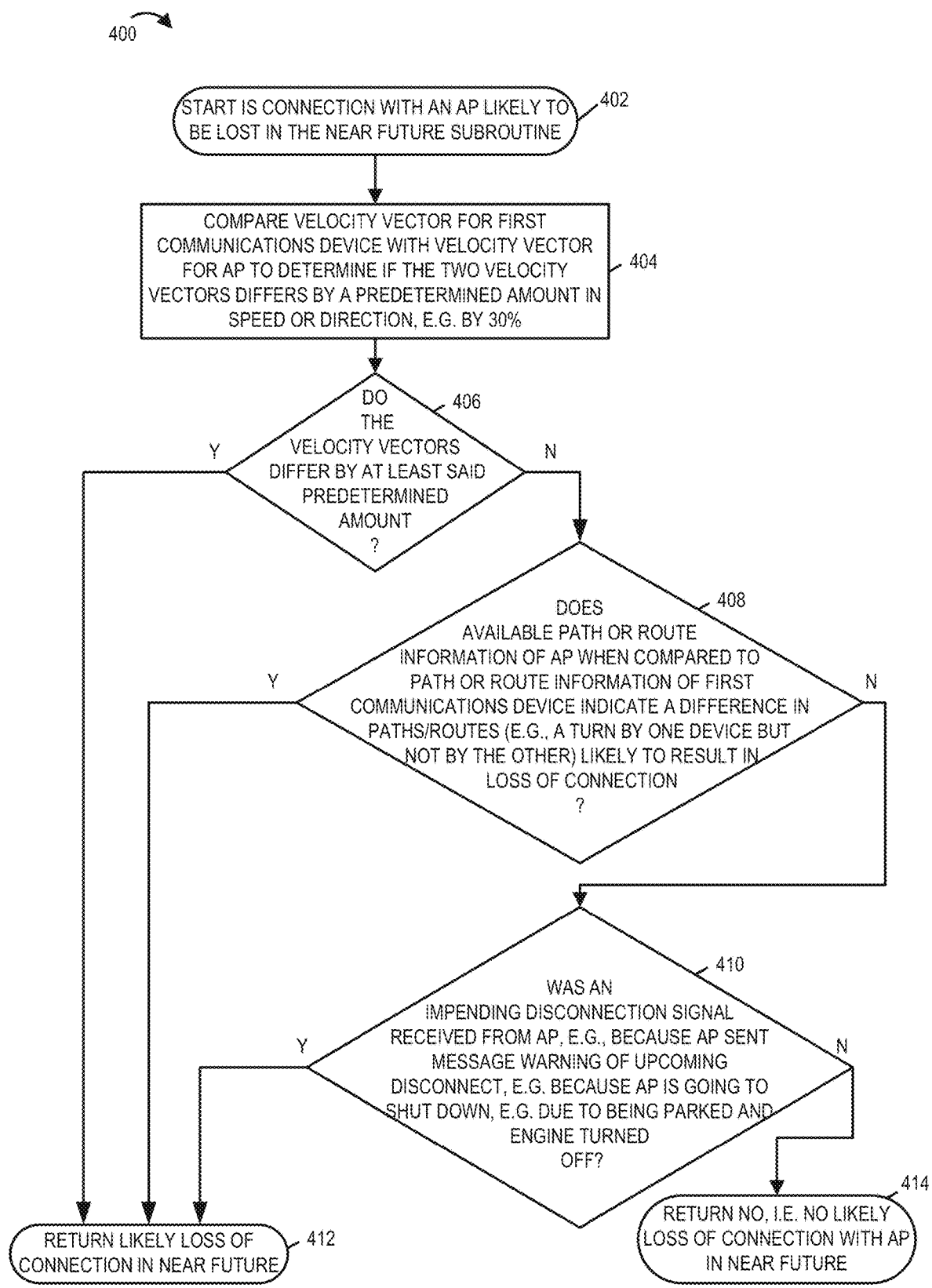
FIG. 4 is a flowchart of an exemplary subroutine which evaluates if a connection with an access point is likely to be lost in the near future, in accordance with an exemplary embodiment.

FIG. 4 is a flowchart 400 of connection with an AP likely to be lost in the near future subroutine in accordance with an exemplary embodiment. Operation starts in step 402 and proceeds to step 404. In step 404 the first communications device compares the velocity vector for the first communications device with a velocity vector for an AP to determine if the two velocity vectors differ by a predetermined amount in speed or direction, e.g. 30%. In some embodiments, different threshold percentages are used for direction and speed. Operation proceeds from step 404 to step 406. In step 406 if the velocity vectors being compared differ by at least the predetermined amount then operation proceeds from step 406 to step 412 in which the subroutine returns likely loss of connection in near future.

However, in step 406 if the determination is that velocity vectors being compared do not differ by at least the predetermined amount then operation proceeds from step 406 to step 408. In step 408 the first communications device determines if the available path or route information of the AP when compared to the path or route information of the first communications device indicates a difference in paths or routes (e.g., indicates a turn by one device but not by the other) likely to result in a loss of connection. In step 408 if the first communications device determines that the available path or route information of the AP when compared to the path or route information of the first communications device indicates a difference in paths or routes likely to result in a loss of connection, then operation proceeds from step 408 to step 412, in which the subroutine retunes a likely loss of connection in the near future; otherwise, operation proceeds from step 408 to step 410.

In step 410 the first communications device determines if an impending disconnection signal was received from an AP, e.g. because AP sent a message warning of and upcoming disconnect, e.g. because AP is going to be shut down, e.g., due to being parked and engine shut off. If the determination of step 410 is that an impending disconnection signal was received from the AP, then operation proceeds from step 410 to step 412, in which the first communications device returns likely loss of connection in near future. However, if the determination of step 410 is that an impending disconnection signal was received from the AP, then operation proceeds from step 410 to step 414, in which the first communications device returns no, i.e. no likely loss of connection with AP in near future.

Returning to step 258, in step 258 if one of the returns from the call connection likely lost subroutine returns— likely loss of connection in near future, then operation proceeds from step 258 to step 260, in which the first communications device determines to initiate a scan. However, if each of the returns from the call connection likely lost subroutine return—no, then operation proceeds from step 258 to step 262, in which the first communications device determines not to initiate a scan. Operation proceeds from step 260, via connecting node D 264 to step 264, in which another scan is initiated. Operation proceeds from step 262, via connecting node E 266, to step 266, in which the first communications device performs one or more QoS determinations for established connections.

Various aspects and/or features of the flowcharts 200, 300 and 400 of FIGS. 2, 3 and 4 are further described below. A prioritization subroutine (flowchart 300 of FIG. 3), called in step 210, is used as a subroutine for determining (based upon the results from the subroutine) and the evaluation of step 212, if a new network scan (step 206) should be initiated. A network scan (step 206) is also initiated when there is an actual loss of a connection (step 256 yes) or a determination that a connection loss is likely to occur in the near future (step 258 yes) (See step 260 and connecting node D 264 which leads to step 206). Without loss of connection, the flow still includes a loop through the QoS check (step 220) followed by load balancing in step 226. Since a connection loss or an impending connection loss will trigger a new scan and connection establishment process, followed by QoS checks and load balancing after each time new connections are made, the processes allows for new connections to be established in many cases prior to loss of a connection or all connections in use at a given time since path divergence triggering a decision that a loss of connection is likely thus allowing for a scan and new connection establishment process to proceed before actual loss of one or more connections.

The step (258) of deciding whether a connection loss is likely is implemented using a call to a subroutine (flowchart 400 of FIG. 4) in some embodiments which returns an indication of whether a connection loss is likely in the near future or not.

Prioritization of a set of connections is based on the information available during each pass through the prioritization step (210). In at least some embodiments the prioritization step is implemented by a call to a prioritization subroutine (flowchart 300 of FIG. 3). During the first pass through the prioritization subroutine only signal strength information is available allow with information on which APs signals were received from. Stored information may be, and sometimes is, accessed to determine if the AP is a known stationary AP or a mobile AP. The device may, and sometimes does, include a list of known stationary APs and if a detected AP is not on the listed it is assumed to be a mobile AP.

While the communications device may be, and often is, a car or other mobile device, in some cases it may be parked for an extended period of time. As part of the prioritization process a check is made if the communications device has remained stationary for a predetermined period of time (see step 312).

If the communications device has remained stationary for a predetermined amount of time it is considered to be a stationary device (step 314) and a preference is made for connections to stationary APs. In such a case, when the communications device is considered stationary, stationary APs with acceptable received signal levels, e.g., above the minimum threshold, will be given higher priority than mobile APs and will be prioritized based on the detected received signal strength of the signals received from the stationary APs. Mobile APs will then be prioritized, e.g., based on signal strength and/or how quickly they are moving away from the communications device.

If the communications device is not stationary, e.g., has been moving or has temporarily stopped motion for a brief period of time, e.g., due to braking, the communications device is considered to be a mobile device in which case, the most recent motion vector available for the communications device is determined (step 316), e.g., if the device is still moving the current velocity vector is determined; however, if the device has briefly paused motion, e.g. due to braking, the device's most recent direction (heading) and speed prior to the brief stop in motion are used as the velocity vector. This information is used (in step 330) in prioritizing APs for which similar information (AP velocity vectors of step 329) is available.

It should be appreciated that during an initial connection establishment process, at the time of prioritization velocity and/or path information for APs may not be available since the initial AP prioritization and connections may and normally will preceded the receipt of such information from APs in one or more messages. Accordingly, during the initial pass through the prioritization loop APs may be prioritized based on whether they are stationary and/or on the strength of signals received from the APs.

However, once velocity and/or path information is available the velocity (motion) vectors of the communications device and APs can be compared (step 330) and the APs are prioritized based on both the received signal strength and how long the APs are likely to remain in communications range of the communications device. APs which are likely to remain in communication with the communications device for a longer period of time are given a higher priority than communications devices which are to remain in communications range a shorter period of time.

The methods and apparatus of the invention can be used with devices which can establish one or multiple connections with APs at a given time. While multiple connections may be established in parallel, the total number of connections may be intentionally limited to a predetermined number of APs with the selected APs being the APs in the prioritized list with the highest priorities. For example, if the communications device supports 3 connections with APs at a given time, the communications device would select the 3 highest priority APs in the prioritized list of APs to establish and maintain communications links with.

Figure 5:
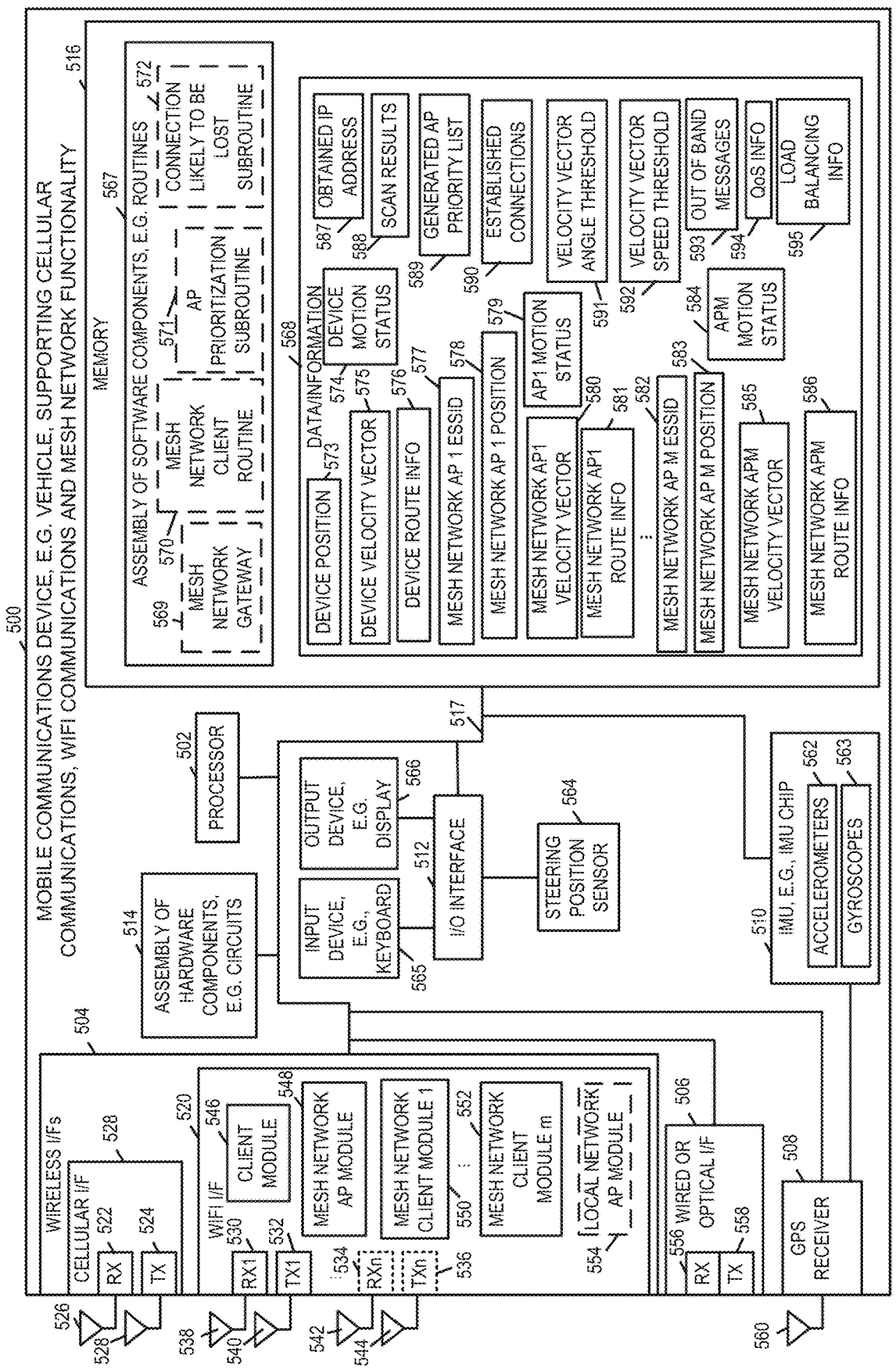
FIG. 5 is a drawing of an exemplary mobile communications device, e.g., a vehicle, supporting cellular communications, WiFi communications and mesh network functionality, in accordance with an exemplary embodiment.

FIG. 5 is a drawing of an exemplary mobile communications device 500, e.g., a vehicle, supporting cellular communications, WiFi communications and mesh network functionality, in accordance with an exemplary embodiment. Exemplary mobile communications device 500 is, e.g., any of the mobile communications devices (112, 114, 116, 118, 120, 122, 124, 126, 128, 130, 132, 134, . . . , 136) of system 100 of FIG. 1, a first communications device implementing the method of flowchart 200 of FIG. 2, the method of flowchart 300 of FIG. 3, and/or the method of flowchart 400 of FIG. 4, any of the mobile access points described in flowchart 200 of FIG. 2, flowchart 300 of FIG. 3, and/or the method of flowchart 400 of FIG. 4, a communications device including assembly of components 600 of FIG. 6, assembly of components 700 of FIG. 7 and/or assembly of components 800 of FIG. 8, any of the mobile communications devices (912, 918, 920, 922, 924, 926, 928, 930, 932, 934) of FIG. 9, a communications device implementing steps of the method of flowchart 1000 of FIG. 10, a master described with respect to flowchart 1000 of FIG. 10, any of device 1102, 1104 of FIG. 12, any of devices 1202, 1204 of FIG. 12, any of device 1302, 1304 of FIG. 13, and/or any of devices 1502, 1504, 1506, 1508 of FIGS. 14 and 15.

Exemplary mobile communications device 500 includes a processor 502, e.g., a CPU, wireless interfaces (I/Fs) 504, a wired or optical interface 506, a GPS receiver 508, an inertial measurement unit (IMU) 510, e.g., an IMU chip, an input/output (I/O) interface 512, an assembly of hardware components 514, e.g., an assembly of circuits, and memory 516 coupled together via a bus 517 over which the various elements may interchange data and information.

Wireless interfaces 504 includes a cellular interface 528 and a WiFi interface 520. The cellular interface 528 includes a receiver (RX) 522 and a transmitter (TX) 524. The receiver 522 is coupled to receive antenna 526 via which the mobile communications device 500 receives cellular downlink signals from a cellular base station. The transmitter 526 is coupled to transmit antenna 528 via which the mobile communications device sends cellular uplink signals a cellular base station.

WiFi interface 520 includes one or more receiver transmitter pairs ((RX 1 530, TX 1 532), . . . , (RX n 534, TX n 536)) via which the mobile communications device 500 receives and sends WiFi signals. RX 1 530 is coupled to receive antenna 538 via which the mobile communications device 500 receives WiFi signals. TX 1 532 is coupled to transmit antenna 540 via which the mobile communications device 500 transmits WiFi signals. RX n 534 is coupled to receive antenna 542 via which the mobile communications device 500 receives WiFi signals. TX n 536 is coupled to transmit antenna 544 via which the mobile communications device 500 transmits WiFi signals. WiFi interface 520 further includes a client module 546, a mesh network AP module 548, and a plurality of mesh network client modules (mesh network client module 1 550, . . . , mesh network client module m 552). In some embodiments, WiFi interface 520 includes a local network AP module 554. In some embodiments, a RX/TX pair, e.g., the pair of TX1 530, TX 1 532, is used by one or more of the different modules (546, 548, 550, 552, 554) at different times, e.g., in a multiplexed manner. Client module 546 controls WiFi interface operations with regard to mobile communications device 500 operating as a client device with respect to a fixed WiFi AP.

Mesh network AP module 548 controls WiFi interface operations with regard to mobile communications device 500 operating as a mesh network WiFi access point (AP), e.g., a master device, for other mobile wireless communications devices in accordance with the present invention. Mesh network client module 1 550 controls WiFi interface operations with regard to mobile communications device 500 operating as a client device (slave device) to a mesh network WiFi access point (AP), e.g., a master device, in accordance with the present invention. Mesh network client module m 552 controls WiFi interface operations with regard to mobile communications device 500 operating as a client device (slave device) to another mesh network WiFi access point (AP), e.g., another master device, in accordance with the present invention. Local network AP module 554 controls WiFi interface operations with regard to mobile communications device 500 operating as a local WiFi access point (AP), e.g., for client devices which are, e.g., wireless devices of passengers in the vehicle.

Wired or optical interface 506 includes a receiver 556 and a transmitter 554, which allows the mobile communications device 500 to be connected to a wired or optical line, e.g., when at a fixed location, e.g. at a repair facility.

GPS receiver 508 is coupled to GPS antenna 560, via which the mobile communications device 500 receives GPS signals from GPS satellites. Based on the received GPS signals, the GPS receiver determines, time, position (latitude/longitude/altitude) and velocity information. In some embodiments, the GPS receiver performs navigation functions and determines heading information and/or orientation information. In some embodiments, the GPS receiver 508 receives information from IMU 510 used in initializing navigation and/or aiding navigation computations, e.g. when GPS signals are lost or degraded.

IMU 510 includes accelerometers 562, e.g. a triad of 3 orthogonal accelerometers, for measuring acceleration from which velocity information and/or change in position information can be, and sometimes is derived. IMU 510 also includes gyroscopes, e.g. 3 gyroscopes, for measuring rotations and for determining orientation (e.g., roll, pitch, heading) and determining changes in orientation, e.g., sensing the vehicle's direction, sensing a change in direction or sensing going into a turn. In some embodiments, navigation functions are performed by device 500, e.g. with computation being performed in processor 502 based on information received from GPS receiver 508 and IMU 510.

Mobile communications device 500 further includes an input device 565, e.g., a keyboard, and output device 566, e.g., a display, and a steering position sensor 564, e.g. steering wheel position sensor or steering box, linkage or rack sensor for measuring the wheel direction, e.g., off the straight ahead direction, e.g. used to determine a turn and/or the severity of the turn. The various I/O devices 565, 564 and 566 are coupled to I/O interface 512, which couples the I/O devices to bus 517 and to processor 502.

Memory 516 includes an assembly of software components 567, e.g. routines, and data/information 568. Assembly of software components 567 includes a mesh network gateway 569, a mesh network client routine 570, an access point prioritization subroutine 571 an a connection likely to be lost in the near future subroutine 572. In some embodiments, the mesh network client routine 570 implements the flowchart of FIG. 2. In some embodiments, the AP prioritization subroutine 571 implements the flowchart of FIG. 3. In some embodiments, the connection likely to be lost subroutine 572 implements the flowchart of FIG. 4.

Data/information 568 includes a set of information corresponding to device 500 including: device position 573, e.g. a current position fix of device 500, e.g., based on GPS information, device motion status 574, e.g. information indicating whether device 500 is in motion, is not in motion and has been stationary for at least a predetermined period of time, or is not in motion but not to been stationary for the predetermined period of time, a device velocity vector 575 indicating the current direction and speed of device 500, device route information 576, e.g. information indicating a planned route for device 500 and/or any deviation from the planned route. In some embodiments, when the device 500 is stationary, but has not been stationary for the predetermined period of time, a device velocity vector is determined, e.g. based on device velocity during a prior time while the vehicle 500 was still in motion.

Data/information 568 includes a set of information corresponding to each mesh network access point (AP) to which device 500 is connected and/or is considering as a candidate AP. Data/information 568 includes a first set of information corresponding to a first mesh network AP including: mesh network AP1 ESSID 577, mesh network AP1 position 578, e.g. a current position fix of AP1, e.g., based on GPS information communicated to device 500, AP1 motion status 579, e.g. information indicating whether mesh network AP1 is in motion, is not in motion and has been stationary for at least a predetermined period of time, or is not in motion but not to been stationary for the predetermined period of time, a mesh network AP1 velocity vector 580 indicating the current direction and speed of mesh network AP1, mesh network AP1 route information 581, e.g. information indicating a planned route for mesh network AP1 and/or any deviation from the planned route. In some embodiments, when mesh network AP1 is stationary, but has not been stationary for the predetermined period of time, a mesh network AP1 velocity vector is determined, e.g. based on AP1 velocity during a prior time while AP1 was still in motion. Data/information 568 further includes a mth set of information corresponding to a mth mesh network AP including: mesh network APM ESSID 582, mesh network APM position 583, e.g. a current position fix of APM, e.g., based on GPS information communicated to device 500, APM motion status 584, e.g. information indicating whether mesh network APM is in motion, is not in motion and has been stationary for at least a predetermined period of time, or is not in motion but not to been stationary for the predetermined period of time, a mesh network APM velocity vector 585 indicating the current direction and speed of mesh network APM, mesh network APM route information 586, e.g. information indicating a planned route for mesh network APM and/or any deviation from the planned route. In some embodiments, when mesh network APM is stationary, but has not been stationary for the predetermined period of time, a mesh network APM velocity vector is determined, e.g. based on APM velocity during a prior time while APM was still in motion.

Data/information 568 further includes an obtained IP address 587 for mobile communications device 500, e.g. to be used with regard to the mesh network, scan results 588, e.g. indicating detected WiFi signals from mesh network WiFi APs which satisfy minimum requirements, e.g. minimum acceptable signal strength for a connection, a generated AP priority list 589 of mesh network APs which satisfy a set of criteria (e.g., same general direction as vehicle 500, AP velocity vector with regard to velocity vector of vehicle 500 had an angle deviation of less than a threshold, speed difference between AP and vehicle 500 less than threshold, received signal strength of AP signal above minimum acceptable requirement, QoS with regard to AP above threshold, etc.) which is updated in accordance with features of the present invention. Data/information 568 further includes established connections information 590, e.g. information identifying the connections and/or mesh network APs corresponding to the connections, a velocity vector angle threshold 591, e.g. 30%, a velocity vector speed threshold 592, e.g. a difference in speed of 20%, out of band messages 593, e.g. an urgent received message which sent by a mesh network AP, to which device 500 (as a client device) is connected, indicating that the mesh network AP is making a deviation from its route or abrupt turn and expects that communications will be lost in the near future, a message communicating position and/or location information of an AP. etc. Data/information 568 further includes QoS information 594, e.g., corresponding to each of a plurality of candidate mesh node APs, and load balancing information 595, e.g. used to determine relative amount of data packets to be sent to each of a plurality of mesh node APs to which the device 500 is currently connected, e.g., as a client (slave).

Figure 6A:
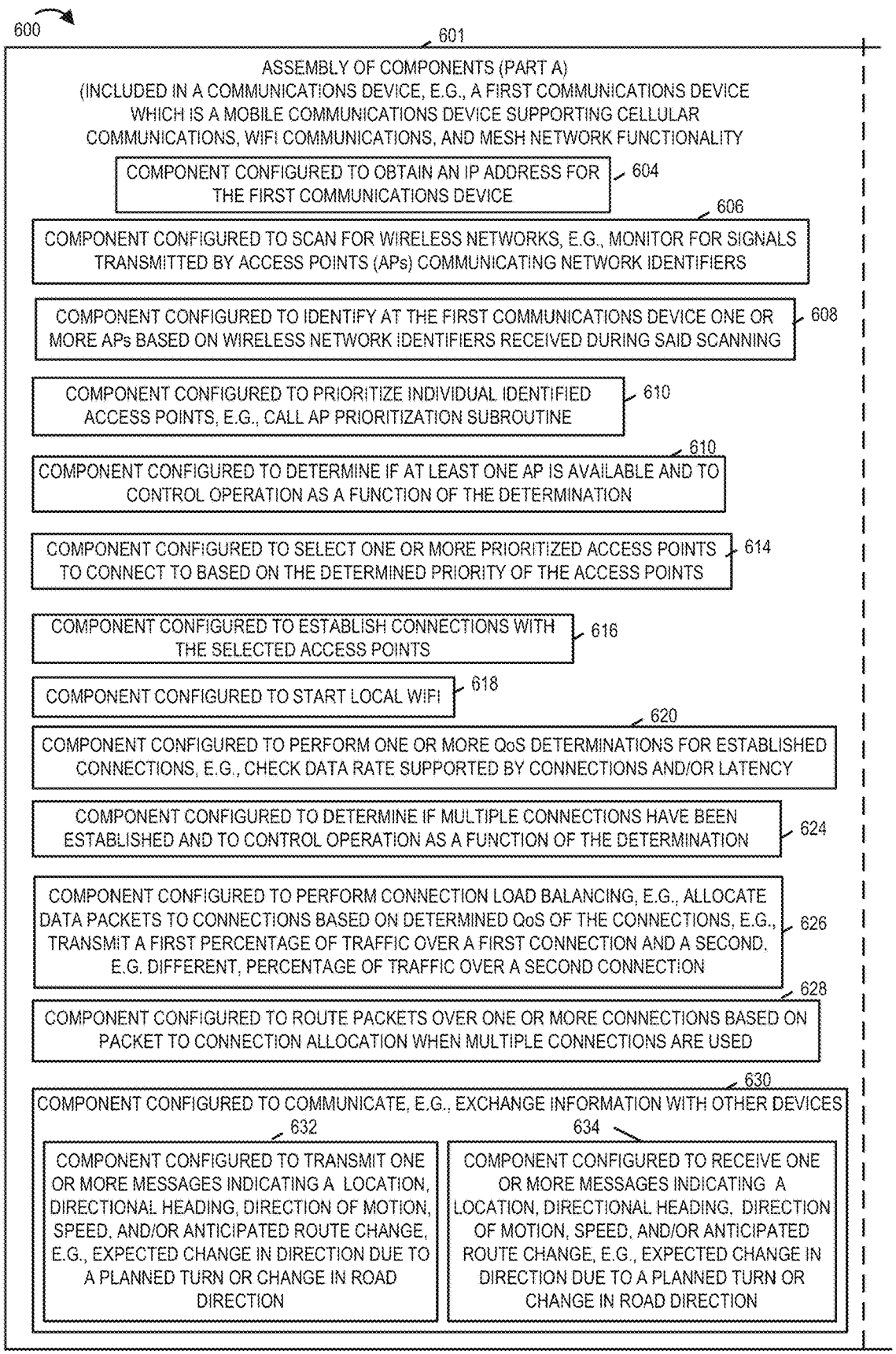
FIG. 6A is a first part of a drawing of an exemplary assembly of components which may be included in a communications device, e.g., the communications device of FIG. 5, to implement an exemplary method of operating the communications device, e.g. the method of the flowchart of FIG. 2.
Figure 6:
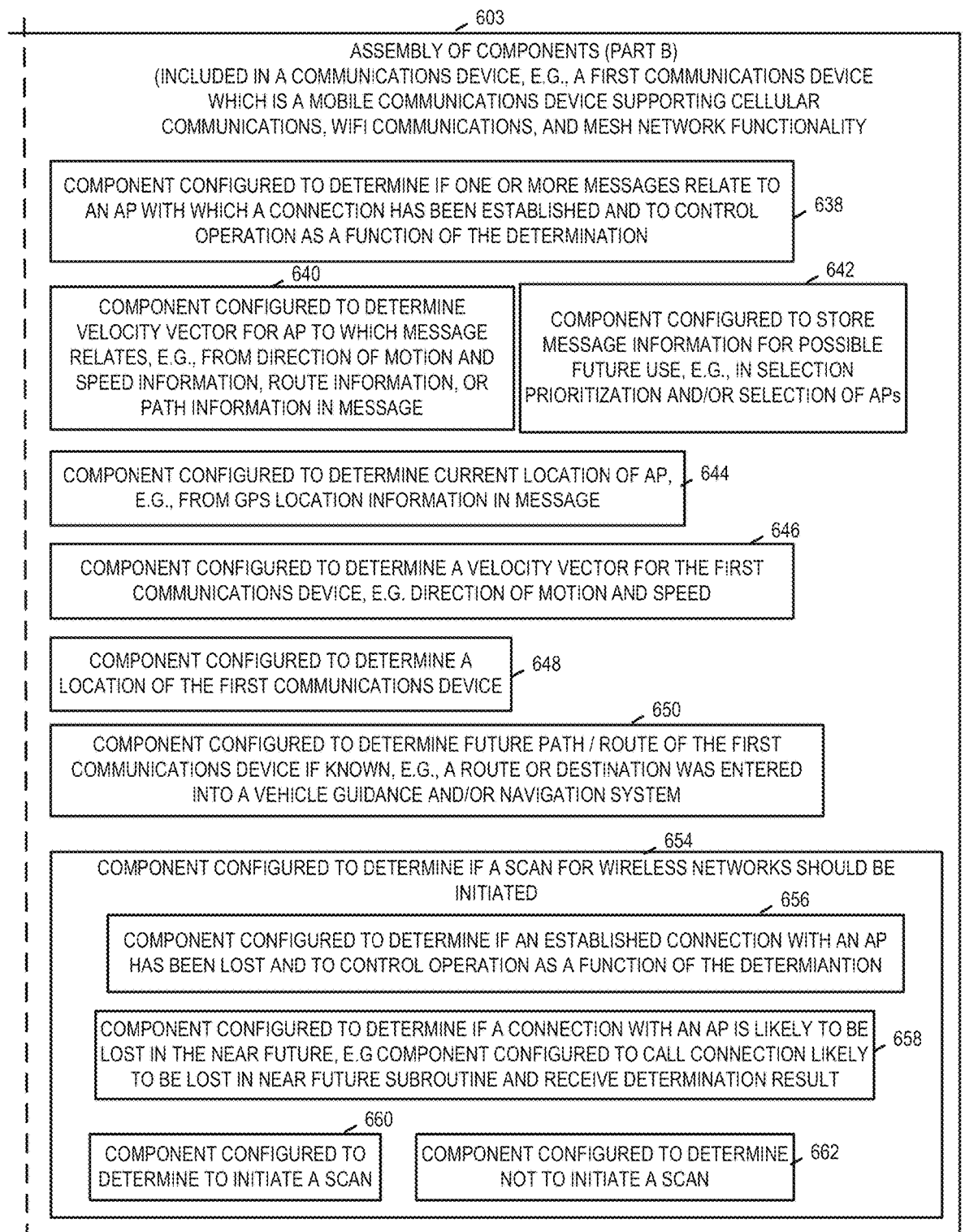
FIG. 6 comprises the combination of FIG. 6A and FIG. 6B.

FIG. 6, comprising the combination of FIG. 6A and FIG. 6B is a drawing of an exemplary assembly of components 600, comprising the combination of Part A 601 and Part B 603, which may be included in a communications device, e.g., a first communications device, which is a mobile communications device supporting cellular communications, WiFi communications and mesh network functionality, in accordance with an exemplary embodiment, Assembly of components 600 is, e.g., used to implement the method of the flowchart of FIG. 2.

Exemplary assembly of components 600 may be, and sometimes is, included in an exemplary mobile communications device, e.g., mobile communications device 500 of FIG. 5, and implements steps of an exemplary method, e.g., steps of the method of the flowchart 200 of FIG. 2.

The components in the assembly of components 600 can be, and in some embodiments are, implemented fully in hardware within the processor 502, e.g., as individual circuits. The components in the assembly of components 600 can, and in some embodiments are, implemented fully in hardware within the assembly of hardware components 514, e.g., as individual circuits corresponding to the different components. In other embodiments some of the components are implemented, e.g., as circuits, within the processor 502 with other components being implemented, e.g., as circuits within assembly of components 514, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 516 of the mobile communications device 500, with the components controlling operation of the mobile communications device to implement the functions corresponding to the components when the components are executed by a processor, e.g., processor 502. In some such embodiments, the assembly of components 600 is included in the memory 516 as assembly of software components 567 or as part of assembly of software components 567, e.g. mesh network gateway 569 and/or mesh network client routine 570. In still other embodiments, various components in assembly of components 600 are implemented as a combination of hardware and software, e.g., with another circuit external to the processor providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 600 is stored in the memory 516, the memory 516 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the mobile communications device 500, or elements therein such as the processor 502, to perform the functions of corresponding steps illustrated and/or described in the method of one or more of the flowcharts, signaling diagrams and/or described with respect to any of the Figures. Thus the assembly of components 600 includes various components that perform functions of corresponding one or more described and/or illustrated steps of an exemplary method, e.g., steps of the method of flowchart 200 of FIG. 2 and/or described or shown with respect to any of the other figures. Assembly of components 600 includes a component 604 configured to obtain an IP address for the first communications device, a component 606 configured to scan for wireless network, e.g., monitor for signals transmitted by access points (APs) communicating network identifiers, a component 608 configured to identify at the first communications device one or more APs based on wireless network identifiers received during said scanning, a component 610 configured to prioritize individual identified access points, e.g. call an AP prioritization subroutine and receive a prioritization list. Assembly of components 600 further includes a component 610 configured to determine if at least one AP is available and to control operation as a function of the determination, a component 614 configured to select one or more prioritized access points (access points of other mobile wireless communications participating in the mesh network) to connect to based on the determined priority of the access points, a component 616 configured to establish connections with the selected access points, and a component 618 configured to start a local WiFi, e.g. a very short range local WiFi intended for the passengers' personal wireless devices inside the vehicle, which is the first mobile communications device.

Assembly of components 600 further includes a component 620 configured to perform one or more QoS determinations for established connections, e.g. check data rate supported by connections and/or latency, a component 624 configured to determine if multiple connection have been established and to control operation as a function of the determination, a component 626 configured to perform connection load balancing, e.g., allocate data packets to connections based on determined QoS of the connection, e.g. transmit a first percentage of traffic over a first connection and a second, e.g different percentage of traffic over a second connection, e.g. when multiple connections are being used, and a component 628 configured to route packets over one or more connections based on packet to connection allocation when multiple connections are used.

Assembly of components 600 further includes a component 630 configured to communicate, e.g. exchange information, with other devices. Component 630 includes a component 632 configured to operate the first communications device to transmit one or more messages indicating a location, directional heading, direction of motion, speed, and/or anticipated route change, e.g. expected change in direction due to a planned turn or a change in road direction and a component 634 configured to operate the first communications device to receive one or more messages indicating a location, directional heading, direction of motion, speed, and/or an anticipated rate change, e.g., expected change in direction due to a planned turn or change in road direction.

Assembly of components 600 further includes a component 683 configured to determine if one or more messages, e.g. one or more received messages, relate to an AP with which a connection had been established and to control operation as a function of the determination, a component 640 configured to determine a velocity vector for an AP to which the received message relates, e.g., from direction of motion and speed information, route information, or path information in the message, a component 642 configured to store message information from a received message, e.g., corresponding to an AP with which the first communications device does not currently have a connection, for possible future use, e.g. in prioritization of selected APs and/or in selection of APs. Assembly of components 600 further includes a components 644 configured to determine a current location of an AP, e.g. from GPS information in a received message, a component 646 configured to determine a velocity vector for the first communications device, e.g., determine the direction of motion and speed of the first communications device from an output of a GPS receiver, from output of an IMU, and/or from output of a navigation routine being run by the first communications device, e.g., using GPS and IMU information, a component 648 configured to determine the location of the first communications device, e.g. from GPS and/or IMU information, and a component 650 configured to determine a future path/route of the first communications device if known, e.g., a route or destination was entered into a vehicle guidance and/or navigation system.

Assembly of components 600 further includes a component 654 configured to determine if a scan for wireless networks should be initiated. Component 654 includes a component 656 configured to determine if an established connection with an AP has been lose and to control operation as a function of the determination, a component 658 configured to determine if a connection with an AP is likely to be lost in the near future, e.g., a component configured to call a connection likely to be lost in near future subroutine and receive a determination result, a component 660 configured to determine to initiate a scan, e.g. in response to a determination that an established connection with an AP has been lost or a determination that an established connection with an AP is likely to be lost in the near future, and a component 662 configured to determine not to initiate a scan at the present time, e.g. in response to a determination that no existing connections with APs have been lost and a determination that no existing connections are likely to be lost in the near future.

Figure 7:
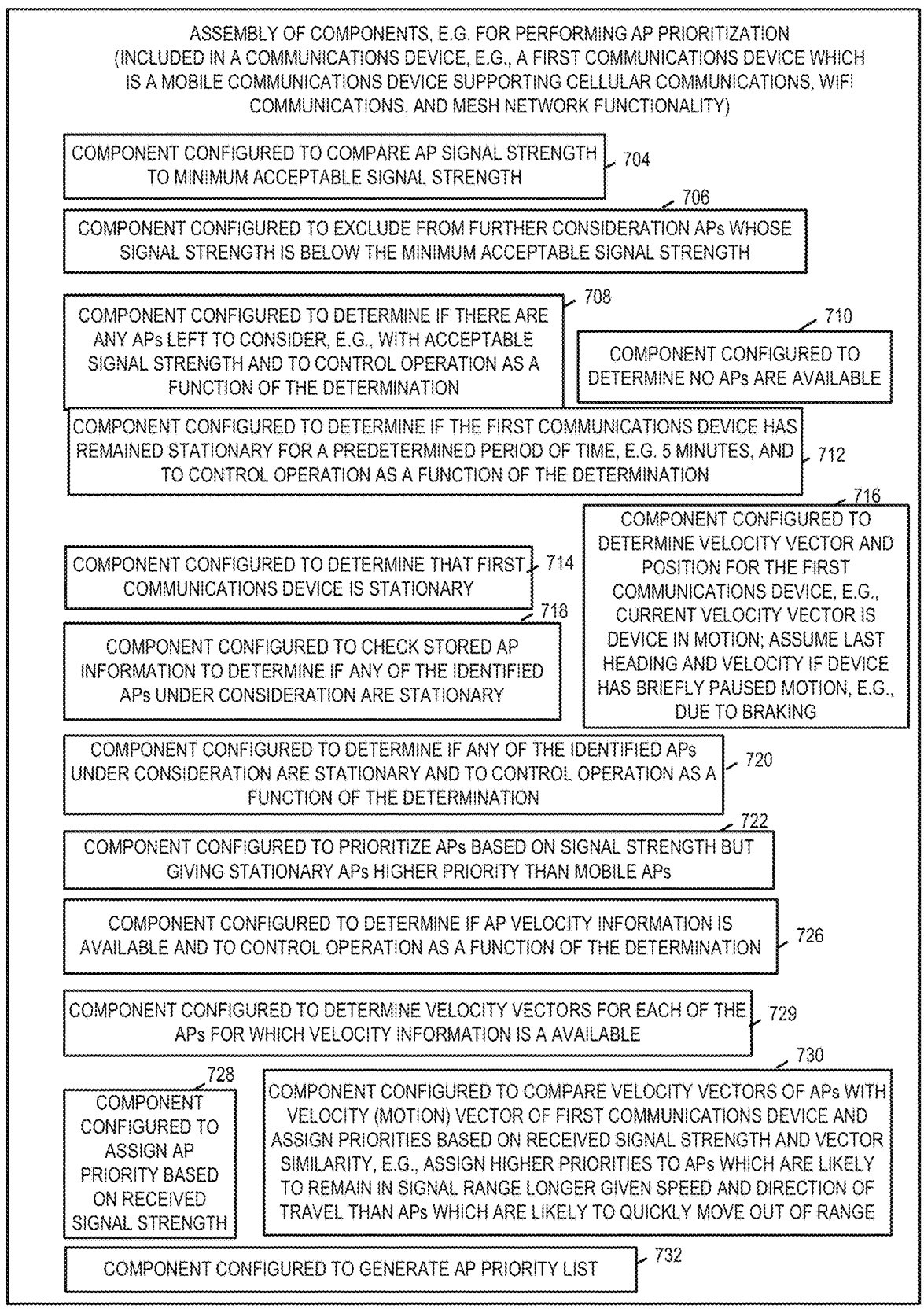
FIG. 7 is a drawing of an exemplary assembly of components which may be included in a communications device, e.g., to implement a method of access point prioritization, e.g. the method of the flowchart of FIG. 2.

FIG. 7 is a drawing of an exemplary assembly of components 700 which may be included in a communications device, e.g., a first communications device which is a mobile communications device supporting cellular communications, WiFi communications and mesh network functionality, to implement a method of performing access point (AP) prioritization, e.g. the method of the flowchart 300 of FIG. 3.

Exemplary assembly of components 700 may be, and sometimes is, included in an exemplary mobile communications device, e.g., mobile communications device 500 of FIG. 5, and implements steps of an exemplary method, e.g., steps of the method of the flowchart 300 of FIG. 3.

The components in the assembly of components 700 can be, and in some embodiments are, implemented fully in hardware within the processor 502, e.g., as individual circuits. The components in the assembly of components 700 can, and in some embodiments are, implemented fully in hardware within the assembly of hardware components 514, e.g., as individual circuits corresponding to the different components. In other embodiments some of the components are implemented, e.g., as circuits, within the processor 502 with other components being implemented, e.g., as circuits within assembly of components 514, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 516 of the mobile communications device 500, with the components controlling operation of the mobile communications device to implement the functions corresponding to the components when the components are executed by a processor, e.g., processor 502. In some such embodiments, the assembly of components 600 is included in the memory 516 as assembly of software components 567 or as part of assembly of software components 567, e.g. mesh network gateway 569 and/or AP prioritization subroutine 571. In still other embodiments, various components in assembly of components 700 are implemented as a combination of hardware and software, e.g., with another circuit external to the processor providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 700 is stored in the memory 516, the memory 516 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the mobile communications device 500, or elements therein such as the processor 502, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., steps of the method of flowchart 300 of FIG. 3 and/or described or shown with respect to any of the other figures.

Assembly of components 700 includes a component to compare AP signal strength to a minimum acceptable signal strength, a component 706 configured to exclude from further consideration APs whose signal strength is below the minimum acceptable signal strength, a component 708 configured to determine if there are any APs left to consider, e.g. with acceptable signal strength, and to control operation as a function of the determination, a component 710 configured to determine that there are no APs available, e.g. in response to a determination that there were no detected APs with a signal strength at or above the minimum acceptable signal strength.

Assembly of components 700 further includes a component 712 configured to determine if the first communications device has remained stationary for a predetermined period of time, e.g. 5 minutes, and to control operation as a function of the determination, a component 714 configured to determine that the first communications device is consider to be operating as stationary device, e.g. in response to a determination the first communications device has remained stationary for at least the predetermined period of time, and a component 716 configured to determine a prior velocity vector and current position of the first communications device, e.g., assuming last heading and velocity (e.g., during a time interval prior to halted motion) if device has briefly paused motion, e.g. due to braking, e.g. in response to a determination the first communications device has remained stationary for an amount of time which is less than the predetermined interval of time. In some embodiments, the determined velocity by component 716 is an average velocity during a window of time including the time in which the first communications was moving and the time in which the device is momentarily stationary.

Assembly of components 700 further includes a component 720 configured to determine if any of the identified APs under consideration are stationary and to control operation as a function of the determination, a component 722 configured to prioritize APs based on signal strength, but giving stationary APs higher priority than mobile APs, e.g., when the first communications device is considered to be a stationary communications device. Assembly of components 700 further includes a component 726 configured to determine if AP velocity information is available, e.g., based on recently received messages and/or based on extrapolated data, and to control operation as a function of the determination, a component 729 configured to determine velocity vectors for each of the APs for which velocity information is available, a component 728 configured to assign AP based on received signal strength, e.g., in response to velocity vector information not being available, a component 730 configured to compare velocity vectors of APs with the velocity (notion) vector of the first communications device and to assign priorities based on received signal strength and vector similarity, e.g., assign higher priorities to APs which are likely to remain in signal range longer given speed and direction of travel than APs which are likely to quickly move out of range, and a component 732 configured to generate an AP priority list.

FIG. 8 is a drawing of an exemplary assembly of components 800 which may be included in a communications device, e.g., a first communications device, which is a mobile communications device supporting cellular communications, WiFi communications and mesh network functionality, to implement a method of determining if a connection is likely to be lost in the near future, e.g. the method of the flowchart 400 of FIG. 4.

Exemplary assembly of components 800 may be, and sometimes is, included in an exemplary mobile communications device, e.g., mobile communications device 500 of FIG. 5, and implements steps of an exemplary method, e.g., steps of the method of the flowchart 400 of FIG. 4.

The components in the assembly of components 800 can be, and in some embodiments are, implemented fully in hardware within the processor 502, e.g., as individual circuits. The components in the assembly of components 800 can, and in some embodiments are, implemented fully in hardware within the assembly of hardware components 514, e.g., as individual circuits corresponding to the different components. In other embodiments some of the components are implemented, e.g., as circuits, within the processor 502 with other components being implemented, e.g., as circuits within assembly of components 514, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 516 of the mobile communications device 500, with the components controlling operation of the mobile communications device to implement the functions corresponding to the components when the components are executed by a processor, e.g., processor 502. In some such embodiments, the assembly of components 600 is included in the memory 516 as assembly of software components 567 or as part of assembly of software components 567, e.g. mesh network gateway 569 and/or AP connection likely to be lost subroutine 572. In still other embodiments, various components in assembly of components 600 are implemented as a combination of hardware and software, e.g., with another circuit external to the processor providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 800 is stored in the memory 516, the memory 516 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the mobile communications device 500, or elements therein such as the processor 502, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method, e.g., steps of the method of flowchart 400 of FIG. 4 and/or described or shown with respect to any of the other figures.

Assembly of components 800 includes a component 804 configured to compare a velocity vector for the first communications device with a velocity vector for an AP to determine if the two velocity vectors differ by a predetermined amount in speed of direction, e.g. by 30%, a component 806 configured to determine if the comparison of the velocity vectors which were compared differ by at least said predetermined amount in speed or direction and to control operation as a function of direction, a component 808 configured to determine if the available path or route information of the AP when compared to the path or route information of the first communications device indicates a difference in paths/routes (e.g., a turn by one device and not by the other device) likely to result in a loss of connection and to control operation as a function of the determination, and a component 810 configured to determine if an impending disconnection signal received from an AP, e.g. because the AP is going to shut down, e.g. due to being paring with the engine off, and to control operation as a function of the determination. Assembly of components 800 further includes a component 812 configured to return that a loss of connection is likely in the near future in response to one or more of: i) a determination that the comparison of velocity vectors indicates that two velocity vectors (first communications device and an AP) differ by at least a predetermined amount in speed or a predetermined amount in direction, ii) a determination that paths/routes of the first communications device and an AP indicate a difference in paths/routes likely to result in a loss of connection in the near futures, or iii) an impending disconnection signal was received from an AP. Assembly of components 800 further includes a component 814 configured to return that a loss of connection is not likely in the near future in response to i) a determination that the comparison of velocity vectors indicates that each set of two velocity vectors (first communications device and an AP) do not differ by the predetermined threshold amount in speed or by the predetermined threshold amount in direction, ii) a determination that paths/routes of the first communications device and each of AP indicate do not indicate any difference in paths/routes likely to result in a loss of a connection in the near futures; and iii) a determination that no impending disconnection signals were received from an APs to which the first communications device is connected.

Various aspects and/or features of some embodiments of the present invention are discussed below. A comprehensive look at a MAN (Metropolitan Area Network) would include a vast number of connected devices with various bandwidths and uptime requirements. This could range from a user connected to a fixed Hotspot (WI-FI) or a moving car with a wireless gateway which uses Wi-Fi or cellular to connect to an endpoint. In the latter example, the car (or similar vehicle such as a bus, train, tram, etc.) would have an internal Hotspot device for its occupants. Furthermore, a MAN with mesh capabilities is likely to be the most practical system fro enabling Smart Cities and ensuring fast and dynamic coverage for all nodes.

The two examples (Stationary Hotspots and Mobile Hotspots) have a number of efficiency issues. With a stationary Hotspot, e.g., a Hotspot inside a coffee shop, house, etc., the connectivity is relatively reliable as the modem is usually connected to fixed line (coax cable, phone, fiber, etc.). However, the connectivity is very localized; that is it cannot be used beyond a limited space. The same would be true if the Hotspot device is attached to a pole outdoors. There are obvious limitations, having to do with line-of-sight and distance. If a network operator has already invested in providing wireless capabilities to fixed locations, there are long periods when the network is not being used, e.g. when the user is not at home, when a business location is closed, etc.

Figure 11:
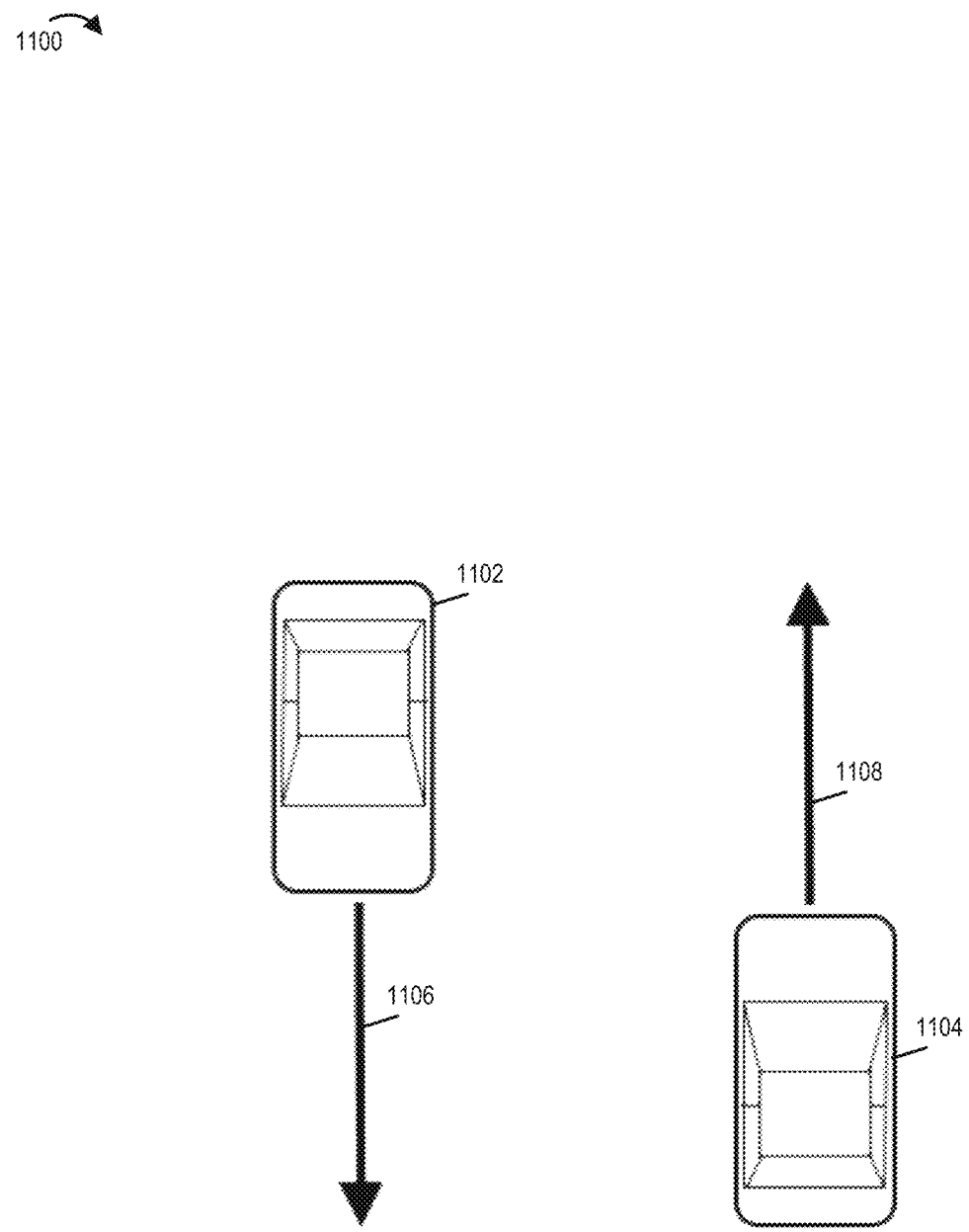
FIG. 11 is a drawing illustrating two exemplary vehicles with wireless communications capabilities, e.g. WiFi and cellular wireless communications capabilities, traveling in different directions, which are not suitable forming a mesh network AP/client device connection at the current time because the devices are currently traveling in different directions.

With mobile Hotspots for connected vehicles, the most common option for external connectivity is the cellular option. This, of course, is not always a viable option with limited bandwidth and dead spots. For vehicle-to-vehicle mesh-network connectivity, which would act as a bridge from unlicensed to licensed band (WIFI then Cellular), the challenge is that the vehicles are in constant motion. This is especially true when the speed of vehicles is considered; this means a connection could be terminated very quickly without enough time to re-connect or locate to an alternative network route. Furthermore, vehicles going in different directions would not be well suited for a reliable connection. FIG. 11 is a drawing illustrating two vehicles (vehicle 1 1102 and vehicle 2 1104) with wireless communications capabilities, e.g. WiFi and cellular wireless communications capabilities. Vehicle 1 1102 is going in a first direction indicated by arrow 1106, while vehicle 2 1104 is going in a second direction indicated by arrow 1108. The first direction is 180 degrees different than the second direction and thus vehicles (1102, 1104) are not well suited for maintaining a reliable connection.

Various exemplary embodiments, implemented with features of the present invention, tie components of a decentralized network within a metropolitan area network (MAN) together, e.g. through a Software Defined Network (SDN). The exemplary components include fixed nodes (in homes, hotspots with extended range, stationary vehicles, etc.) as well as mobile nodes in vehicles (cars, buses, trains, etc.). The main role of the mesh network is to provide fluidity to connected nodes. As bandwidth requirements increase, the mobile nodes handle the extra load without necessarily relying on cellular towers. For instance, during rush hour, connected vehicles would require more bandwidth which poses a challenge. To remedy this, the vehicles (mobile nodes) connect to nearby vehicles in a series of hops that ultimately end up in a connected end-point. In addition, each of the connected vehicles through which a connection is made are more likely to remain within proximity.

FIG. 9 illustrates an exemplary communications system 900 supporting an exemplary mesh network in accordance with an exemplary embodiment. Exemplary communications system 900 includes network 902 including one or more routers, a cell tower 906 including a cellular base station, fixed location WiFi access points (908, 910), a plurality of vehicles (912, 918, 920, 922, 924, 926, 928, 930, 932, 934) including WiFi and cellular communications capability, and exemplary cell phones (914, 916) supporting WiFi communications capability. In the example of FIG. 9, vehicle 912 is currently stationary as indicated by the circle, which vehicles (918, 920, 922, 924, 926, 928, 930, 932, 934) are each currently in motion, with the direction of motion indicated by an arrow shown within the vehicle.

In accordance with a feature of some embodiments, vehicles in motion, which are traveling in the same direction can be, and sometimes are, connected to nearby vehicles, e.g. providing a series of hops that ultimately end up in at connected end point, e.g. a fixed location AP or a cell tower base station. Vehicles (918, 920, 922) are in motion and are traveling in the same direction, e.g. toward the general direction of WiFi AP 908. Vehicle 922 has an established WiFi connection 922 with vehicle 920, where vehicle 920 is serving as a mobile WiFi AP. Vehicle 920 has an established WiFi connection 958 with vehicle 918, where vehicle 918 is serving as a mobile WiFi AP. Vehicle 918 has an established WiFi connection 956 with fixed location WiFi AP 908. In addition, cell phone 914 has an established WiFi connection 976 with fixed location WiFi AP 908. WiFi AP 908 is connected to network 908 via communications link 952.

Vehicles (926, 928, 930, 932) are in motion and are traveling in the same direction, e.g. toward the general direction of cell tower 906. Vehicle 926 has an established WiFi connection 964 with vehicle 928, where vehicle 928 is serving as a mobile WiFi AP. Vehicle 928 has an established WiFi connection 966 with vehicle 930, where vehicle 930 is serving as a mobile WiFi AP. In addition, vehicle 928 has an established WiFi connection 968 with vehicle 932, where vehicle 932 is serving as a mobile WiFi AP. Vehicle 930 has a cellular communications connection with cell tower base station 906. Vehicle 932 has a cellular communications connection with cell tower base station 906.

In addition, vehicle 934, which is motion, but is travelling perpendicular to the direction of vehicle 930, which is in its vicinity, has a cellular connection 974 with cell tower base station 906. Also, vehicle 934, which is in motion, and which is relatively close to WiFi AP 910, has a WiFi connection 962 with WiFi AP 910. Fixed location WiFi AP 910 is connected to network 902 via communications link 954.

Cell phone 916 has an established WiFi connection 978 with stationary vehicle 912, which is serving as a mobile WiFi AP. Stationary vehicle 912 has a cellular connection 980 with cellular base station 906. Cell tower base station 906 is connected to network 902 via communications link 950.

In some embodiments, each of the vehicles (918, 920, 922, 924, 926, 928, 930, 932, 934) may, and sometimes does, support a local WiFi network, e.g., for providing connectivity to devices of the driver and/or passenger in the vehicle.

In various embodiments, an exemplary communications system, implemented in accordance with the some embodiments of present invention includes the following devices: i) mobile nodes supporting WiFi and cellular connectivity, management of outgoing connections and maintenance of mesh network state; ii) fixed WiFi hotspots; and iii) cellular sites, e.g. cell tower base stations. A mobile node, e.g., a vehicle, includes communications components for supporting for WIFI and Cellular connectivity. In addition, the mobile node includes a component, module or function, e.g. a gateway, which manages the outgoing connections and maintains the state of the mesh network. In some embodiments, each mobile node may, and sometimes does, include a secondary WiFi Hotspot module to provide WIFI access to passengers, for example. The fixed Hotspots, e.g. fixed location WiFi access points/routers which offer connectivity through WIFI. The Hotspot routers would in turn be connected to the Internet through Cox, fiber, DSL line, etc. Cellular site devices, e.g. cell tower base stations, can accept connections on a licensed band.

Figure 10:
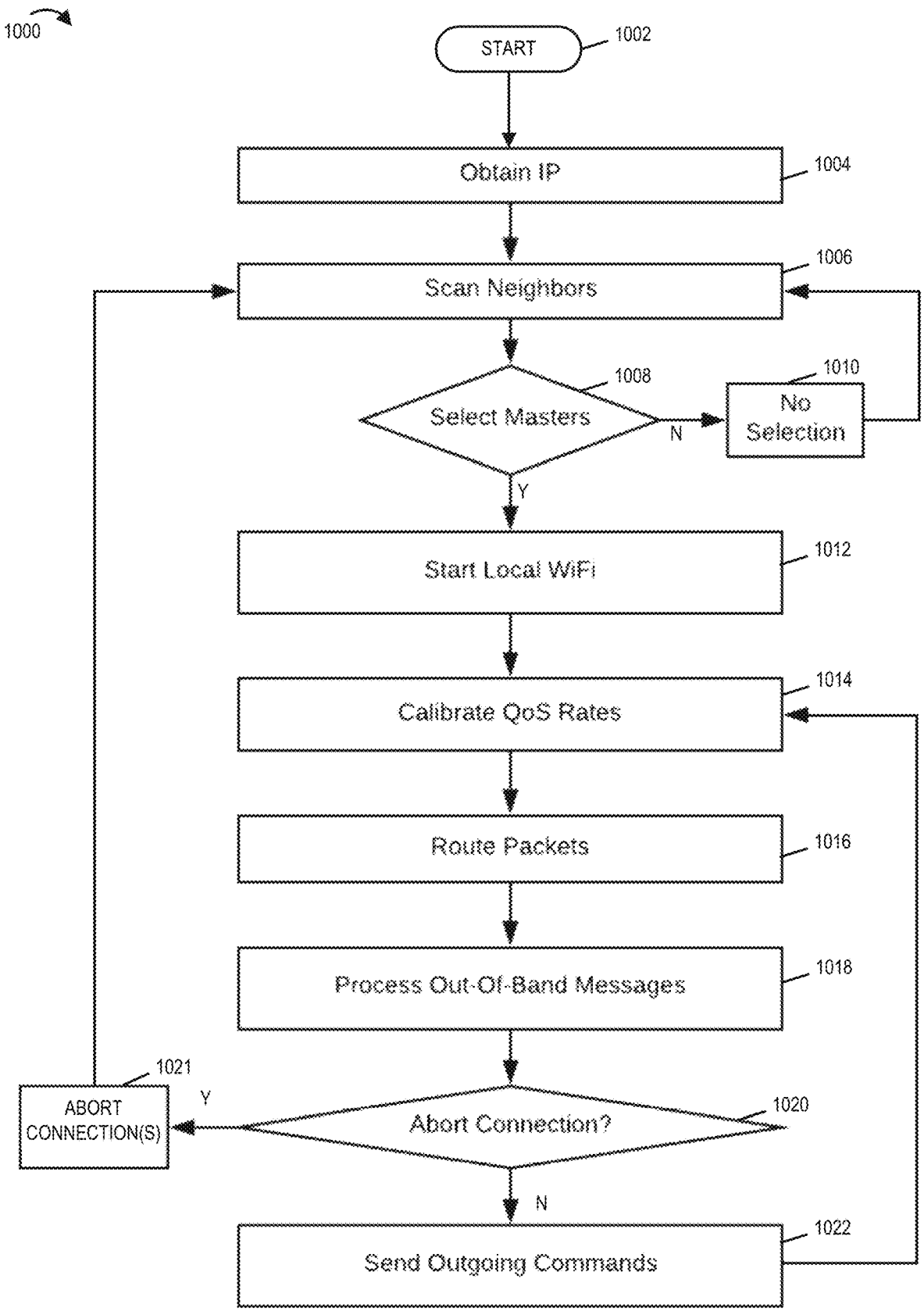
FIG. 10 is a flowchart of an exemplary method of operating a mobile communications device, e.g. vehicle, supporting cellular communications, WiFi communications, and mesh network capabilities in accordance with the various embodiments of the present invention.

FIG. 10 is a flowchart 1000 of an exemplary method of operating a mobile node, e.g. a mobile node supporting WiFi and cellular communications and mesh network capabilities in accordance with the various embodiments of the present invention. Operation starts in step 1002 in which the mobile node is powered on and initialized. Operation proceeds from start step 1002 to step 1104 in which the mobile node obtains an IP. In some embodiments the IP is pre-assigned and loaded into the mobile node, e.g. into the gateway of the mobile node. In some embodiments, the IP is dynamically assigned to the mobile node, e.g. through Dynamic Host Configuration Protocol (DHCP). Operation proceeds from step 1004 to step 1006.

In step 1006 the mobile node scans for neighbors. For example, from within the mobile node, a component, e.g., a gateway, initiates a WiFi scan for any wireless network with shared authentication mechanism, e.g. WiFi profile, etc. The mobile node may detect one or more networks as a result of the scan. Operation proceeds from step 1006 to step 1008.

In step 1008 the mobile node performs operations in an attempt to select one or more masters. Each Access Point (AP) is identified by its unique ESSID (MAC address). One or more APs may have been detected during the scanning. The mobile node, e.g. via its gateway, then joins, e.g., connects to, a best-performing network based on signal strength and other parameters, assuming at least one detected AP satisfied a minimum level of requirement, e.g., a minimum acceptable signal strength. In some embodiments, the mobile node may, and sometimes does, join, e.g., connect to more than one detected AP. Operation proceeds from step 1008 to optional step 1012 or to step 1014, assuming the mobile node has selected at least master. However, if the mobile node has not detected any APs during the scanning which satisfy the minimum acceptable level of requirement for acceptance as a master, then operation proceeds from step 1008 to step 1010 in which the mobile node determines that there has been no selection, and operation proceeds from step 1010 to step 1006 for another scan of neighbors.

In step 1012, which is an optional step, the mobile node starts a local WiFi. Step 1012 entails starting a dedicated WiFi Hotspot for passengers of a vehicle, or a similar configuration where the users are confined to a physical space where the range is fixed. Operation proceeds from step 1012 to step 1014.

In step 1014 the mobile node calibrates Quality of Service (QoS) rates. With each alternative WiFi network to which the mobile node is connected, the mobile node combines a number of factors in selecting the top-performing networks which are predicated predicted to provide the highest quality. Operation proceeds from step 1014 to step 1016.

In step 1016 the mobile node routes packets using the established connection(s), e.g. based on determined QoS rates. Operation proceeds from step 1016 to step 1018.

In step 1018 the mobile node processes out-of band messages, e.g., the mobile node processes received out-of-band messages from other mobile devices communicating, e.g. vehicle position, vehicle velocity information, e.g., speed and direction, vehicle route or path, vehicle path deviation information, vehicle shutdown information, etc. In step 1018 the mobile node also processes received GPS signals, e.g. obtaining its current location an velocity, and generates and transmits messages to other mobile devices, e.g. communicating its position, its velocity information, e.g., speed and direction, its vehicle route or path, any vehicle path deviation information, and/or any vehicle shutdown information. The processing of step 1018 also include using prioritizing the APs, to which the mobile node is connected, based on position, velocity, and other information corresponding to the mobile node and other mobile nodes in its vicinity. Operation proceeds from step 1018 to step 1020.

In step 1020 the mobile node determines if it should abort any connections, e.g. based on the results of the message processing of step 1020. Exemplary reasons for aborting a connection include: a large change in angle between the mobile node and another mobile node to which it is connected, a large change in speed between the mobile node and another mobile node to which it is connected, a detected stop of one of the mobile node and the another node, a detected path change, and/or a notification of an impending power down. If the determination of step 1020 is that a connection should be aborted, then operation proceeds to step 1021, in which the connection is aborted. Operation proceeds from step 1021 to step 1006 for another scan of neighbors. If no connections are to be aborted, then operation proceeds from step 1020 to step 1022.

In step 1022 the mobile node sends outgoing commands. Operation proceeds from step 1022 to step 1014, in which the mobile node calibrates QoS rates.

Various features of an exemplary process for joining a mesh network, in accordance with some embodiments, are described in detail below.

The process of obtaining an IP will now be described. This entails an IP to be obtained or loaded (if pre-assigned), into the mobile node, e.g., into the gateway of the mobile node. A dynamic IP, in some embodiments, is assigned through DHCP or pre-assigned to the mobile node.

The process of a neighborhood scan will now be described. From within the mobile node, the mobile node, e.g. the Gateway of the mobile node, initiates a WIFI scan for any wireless network with shared authentication mechanism (example: WIFI profile, etc.).

Master node selection will now be described. Each Access Point (AP) is identified by its unique ESSID (MAC address). The mobile node, e.g. the gateway of the mobile node, then joins a best-performing network based on signal strength and other parameters.

Calibration of QoS Parameters will now be described. With each network, the system combines a number of factors in selecting the top-performing networks which predicted to provide the highest quality.

Starting of a local WiFi will now be described. This is an optional step and entails starting a dedicated Wi-Fi Hotspot for passengers of a vehicle, or a similar configuration where the users are confined to a physical space where the range is fixed.

Prioritization will now be described. The list of pre-selected networks is matched to the current state of the mobile node (client node) using a pre-defined weight system. For instance, if the mobile node (client node) is not moving, then a Fixed AP would move up the list and be ranked by it signal strength. If the AP is mobile (attached to another vehicle), the following logic is applied:

Determine the direction of the AP to which the mobile node (client node) is attached to. A vector (A) is calculated. If the AP is not moving, then the last direction is used.

Determine the direction of the mobile node (client node) and generate a vector (B).

Calculate the angle between vector A and B.

If the angle is above a certain threshold (example: 30%), then the ESSID is removed from the list as this would indicate the vehicle (AP) is moving in a different direction or will soon deviate from the client's direction (mobile node direction).

GPS data will be used on both the client (mobile node) and the AP to also predict any changes in direction from both. For instance, if one node starts to make a turn (even while the directional angle is within threshold), the AP node would send an urgent notification to connecting clients about the projected change in direction. This could also occur if the road has a bend for example.

Once the client processes the predictive change in angle, it immediately starts to re-process its list of AP candidates and prioritizes them as described previously.

Figure 12:
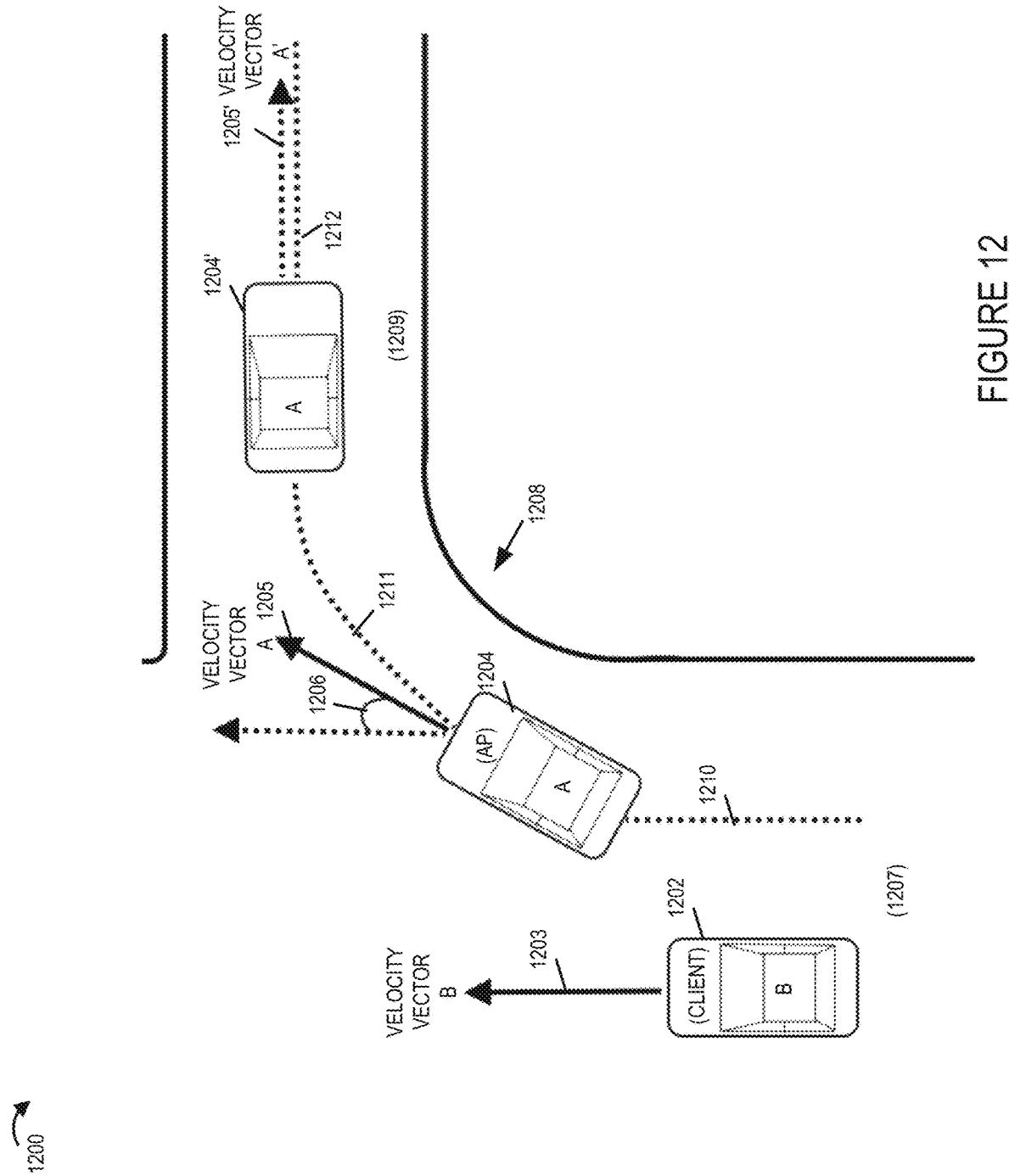
FIG. 12 is a drawing illustrating two exemplary moving vehicles (vehicle A and vehicle B), each supporting Wi-Fi and cellular communications and further supporting mesh networks, which have a mesh network connection, and further illustrates a feature of evaluating the connection and making decisions based on velocity vector similarity, in accordance with an exemplary embodiment.

FIG. 12 is a drawing 1200 illustrating two exemplary moving vehicles (vehicle A 1204 and vehicle B 1203), each supporting Wi-Fi and cellular communications and further supporting mesh networks in accordance with an exemplary embodiment. Vehicle B 1202 (client node) is connected to vehicle A 1204 (AP node), which is serving as a mobile WiFi hot spot. Vehicle A 1204 is one of the candidate APs, on the priority list of APs, being kept by client device 1202. Originally the two vehicles (1204, 1202) are moving along parallel paths in the same general direction with vehicle A 1204 in the lead and on path segment 1210 along road portion 1207.

Vector A 1205 (velocity vector for vehicle A (AP Node) 1204), is determined, e.g., by the client node 1202, e.g., based on information communicated to the client node 1202 from node 1204. The client node 1202 determines its own velocity vector, which is vector B 1203, e.g. based on received GPS signals and/or other measurements from devices or instruments in vehicle 1202. The client device 1202 determines an angle 1206 between the velocity vector A 1205 and the velocity vector B 1203. This operation is performed multiple times as the vehicle A 1204 proceeds into the turn and proceeds on curved path segment 1211. As vehicle A 1204 proceeds along the path segment 1211 of the turn, the angle 1206 between velocity vector A 1205 and velocity vector B 1203 increases. When the angle 1206 is above a certain threshold (example: 30%), then the ESSID corresponding to the AP of vehicle A 1204, is removed from the list, as this would indicate the vehicle A (AP) 1204 is moving in a different direction or will soon deviate from the client's direction (vehicle B 1202 direction).

GPS data will be used on both the client (mobile node) 1202 and the AP node 1204 to also predict any changes in direction from both. For instance, if one node, e.g., vehicle A 1204, starts to make a turn (even while the directional angle 1206 between the two velocity vectors 1203, 1205 is within threshold), the AP node 1204 would send an urgent notification to connecting clients including client node 1202 about the projected change in direction. This could also occur if the road (1207, 1209) has a bend 1208 for example. Then the client node 1202 could respond and take action, e.g., to decide to abort the connection, de-prioritize the connection and/or to switch to using an alternative AP, in response to a determination that the client node 1204 does not intend to follow the AP node 1204 into the turn.

In FIG. 12, vehicle 1204 is shown as vehicle 1204', at a later point in time after the vehicle has completed the turn 1208 and is now moving along path segment 1212 of road 1209 and has velocity vector A' 1205', which is 90 degrees off from velocity vector B 1203 of the client device 1202, assuming vehicle 1202 has continued in a straight line and did not make the turn.

Load balancing will now be described. Each client has a list of APs which could be used to make connection directly or through hops. If more than one AP is available, then the client (through the gateway) can send different Ethernet packets (Layer II on OSI Model) through different AP's. Each AP is then acting like transparent wireless bridge. The packets would ultimately be sent to a common back-end where, for example, the TCP/IP stream would be re-assembled. Each AP has a QoS associated and this would determine the number of packets to receive. For instance, if there are three AP's with QoS of: 20%, 50%, 80% respectively (FIGS. 14 & 15).

Figure 15:
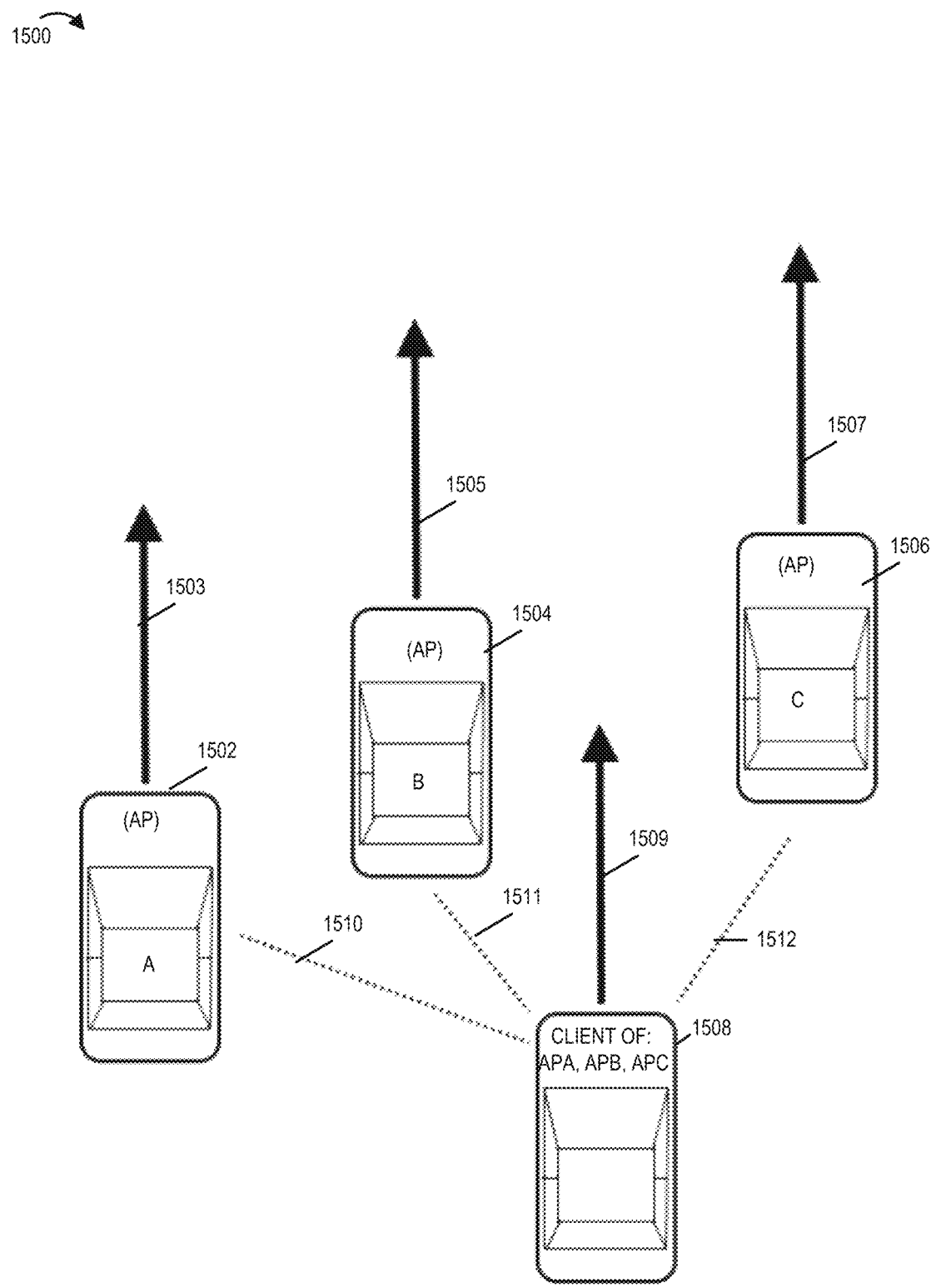
FIG. 15 is a drawing illustrating four exemplary moving vehicles, each supporting Wi-Fi and cellular communications and further supporting mesh networks in accordance with an exemplary embodiment, each of the moving vehicles are moving in the same general direction, as indicated by velocity vectors; three of the vehicles are operating as access points and the fourth vehicle is acting a client device with respect to each of the three access points, with three established mesh network connections, in accordance with an exemplary embodiment.

FIG. 15 is a drawing 1500 illustrating four exemplary moving vehicles (1502, 1504, 1506, 1508), each supporting Wi-Fi and cellular communications and further supporting mesh networks in accordance with an exemplary embodiment. Each of the moving vehicles (1502, 1504, 1506, 1508) are moving in the same direction as indicated by velocity vectors (1503, 1505, 1507, 1509). Vehicle 1508 (client node) is connected to vehicle 1502 (AP A node), which is serving as a mobile WiFi hot spot, via WiFi connection 1510. Vehicle 1508 (client node) is also connected to vehicle 1504 (AP B node), which is serving as a mobile WiFi hot spot, via WiFi connection 1511. Vehicle 1508 (client node) is also connected to vehicle 1506 (AP C node), which is serving as a mobile WiFi hot spot, via WiFi connection 1512. The client node 1508 (e.g. through its gateway) can send different Ethernet packets (Layer II on OSI Model) through different AP's (AP A 1502, AP B 1504, AP C 1506). Each AP (1502, 1504, 1506) is then acting like transparent wireless bridge. The packets would ultimately be sent to a common back-end where, for example, the TCP/IP stream would be re-assembled. Each AP has a QoS associated and this would determine the number of packets to receive. For instance, if there are three AP's (1502, 1504, 1506) with QoS of: 20%, 50%, 80% respectively.

Figure 14:
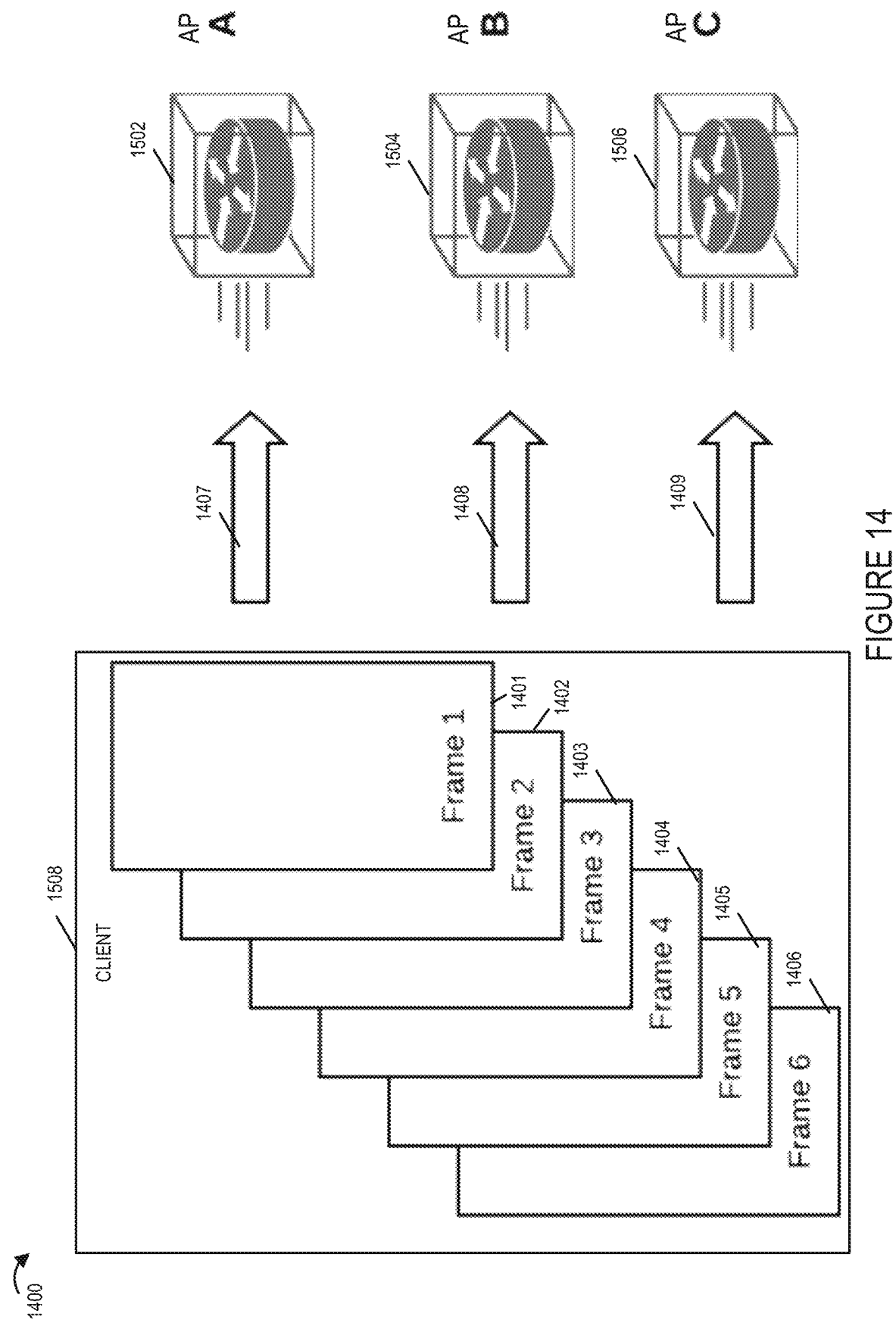
FIG. 14 is a drawing illustrating a plurality of frames including packets of data which are to be transmitted by the client device to one or more access points to which it has mesh network connections, and the number of packets to send to each of the AP is a function of the load balancing determination, e.g. based on QoS information, in accordance with an exemplary embodiment.

FIG. 14 is a drawing 1400 illustrating a plurality of frames (frame 1 1401, frame 2 1402, frame 3 1403, frame 4 1404, frame 5 1405, frame 6 1406) which are to be transmitted by client node 1508. Client device 1502 sends some packets through wireless connection 1510 to AP A 1502, as indicated by arrow 1407. Client device 1502 sends some packets through wireless connection 1512 to AP B 1504, as indicated by arrow 1408. Client device 1502 sends some packets through wireless connection 1512 to AP C 1506, as indicated by arrow 1409. The number of packets sent to each AP (1502, 1504, 1506) is a function of the load balancing determination, e.g. based on QoS information.

A Master-Slave Node Relationship will now be described in the context of an exemplary system including an exemplary mesh network in accordance with an exemplary embodiment. Each node which makes a connection, that is deemed suitable based on QoS rules, to another node is considered a 'Slave Node'. The node which accepts the connection is considered a 'Master Node'. The two nodes form a Layer II (On the OSI Model) network. This connection does not include any other network or nodes on that specific layer. The role of the Master Node is to relay Ethernet frames from the Slave Node. The Master Node might use other networks to forward the data. The next node might be another node (mobile or static). The connection between master-slave is duplex in nature; that is, a master node might send an 'out-of-band' message to the slave node for urgent commands such as imminent disconnect information.

Out of Band Messages in the context of a mesh network in accordance with an exemplary embodiment will now be described. While a node might be used primarily to relay data frames so their ultimate destination, other types of communication is possible. This might include information which would be helpful to any node in order to: react to an imminent degradation of service, disconnect or change of direction of the node (example: vehicle making right-turn). Each of the out-of-band messages are expected to be short and should be processed in timely manner. This is important for the MAN as a whole in order to ensure quick and adaptive responses to ensure high-availability for each of the connected clients.

Predictive Directional Nodes will now be described in the context of an exemplary mesh network in accordance with an exemplary embodiment. In a mobile node (such as a vehicle, bus, train, etc.) the direction of any two nodes is important. It is important between master-slave nodes to have directional vectors within a set maximum (example: 30 degrees). Any increase in the angle would indicate one of the nodes is moving away and the connection is likely to be degraded or disconnected. Geospatial data (obtained from a GPS system) can be, and sometimes is, used to 'predict' where the moving node would be located. For instance, it would be possible to determine if the node would be making a turn or merely changing lanes. This system can be further enhanced by connecting it to the steering wheel and tie its turns to the intended direction.

Figure 13:
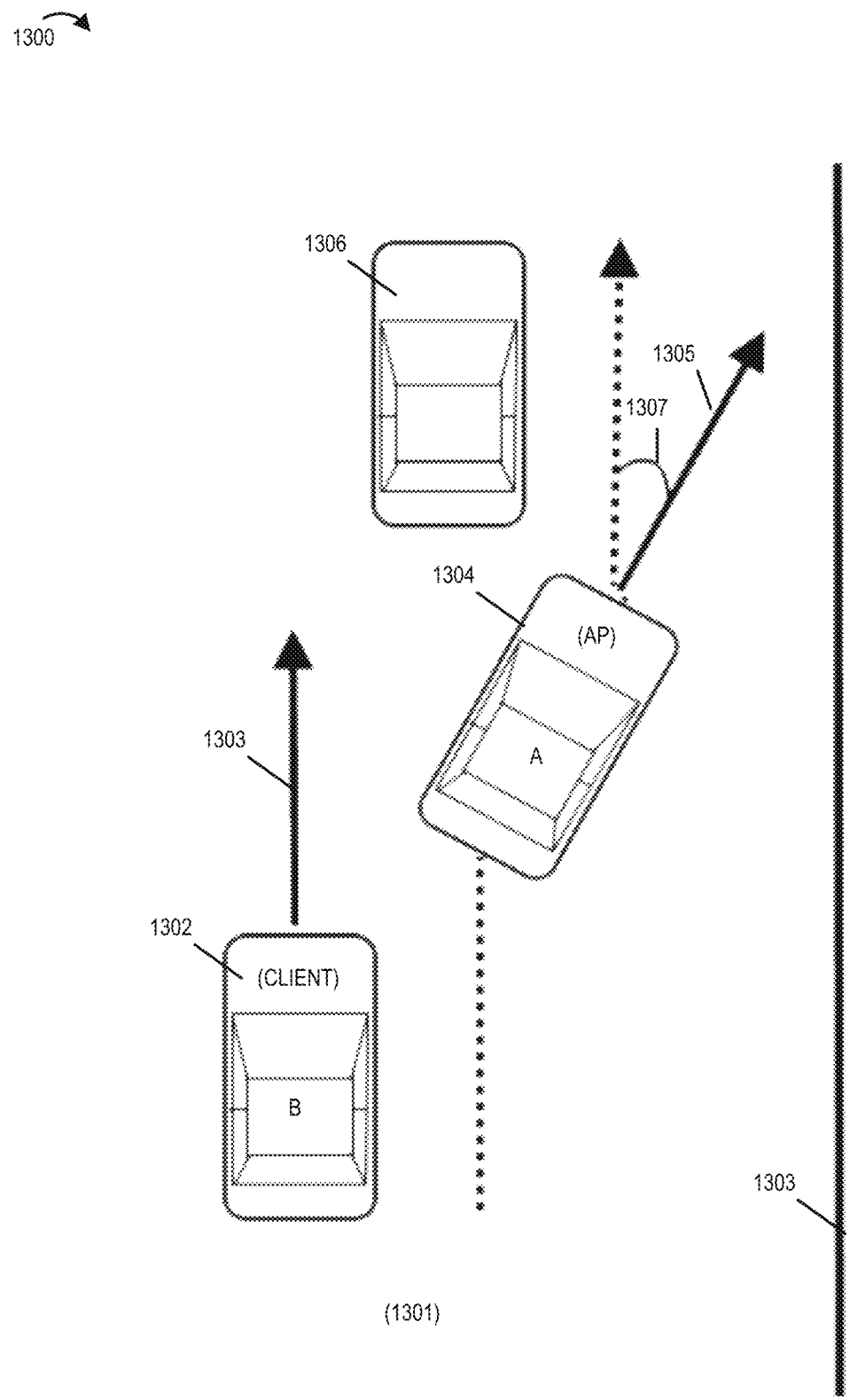
FIG. 13 is a drawing illustrating two exemplary moving vehicles (vehicle A and vehicle B), each supporting Wi-Fi and cellular communications and further supporting mesh networks, which have a mesh network connection, and further illustrates vehicle A steering to avoid a stopped vehicle in the road, and in some embodiments, a sensor which detects the position of the steering wheel in vehicle A, is used to detect the turn, e.g. in addition or in place of vehicle GPS information and/or vehicle IMU information; in some embodiments, measurements allow distinguishing between a lane change and a turn, e.g., off the road to another road, allowing vehicle B to decide whether or not to keep the connection or drop the connection, in accordance with features of some embodiments.

FIG. 13 is a drawing 1300 illustrating two exemplary moving vehicles (1302, 1304, each supporting Wi-Fi and cellular communications and further supporting mesh networks in accordance with an exemplary embodiment. Vehicle 1302 is a client node with respect to vehicle 1304 which is a WiFi AP node. Initially both vehicles (1302, 1304) are traveling in the same direction along road 1301. The edge of road 1301 is shown as solid line 1303. AP vehicle 1304 has to steer around stopped vehicle 1306 and it turns to the right as indicated by its velocity vector 1305 deviating by angle 1307 from the initial direction, which is the direction of vector 1303 (client velocity vector). In some embodiments, a sensor which detects the position of the steering wheel in vehicle 1304 is used to detect the turn, e.g. in addition to vehicle 1304 GPS and/or IMU information. The detected steering wheel motion can be, and sometimes is, used by vehicle 1304 (AP node) to distinguish between lane change and a turn, e.g., off the road to another road.

Load balancing aspects will now be described. Once a node starts a discovery process, it scans all available nodes (mobile and static). A selection is made based on a number of factors which include one or more or all of: i) signal strength, ii) moving direction vector, iii) ping response time, iv) type of target node (mobile vs. stationary, cellular vs. hotspot), and v) cost of cellular connection (if more than one provider is detected). Once the data is collected, the best candidates are selected. Based on QoS and preset of weights, a rating is calculated which should add up to 100% (ex: A: 30%, B: 50% & C: 20%). The percentages will dictate the number of frames which would be sent to each network. For example, if there are 100 frames, then 30 would be sent through A, 50 would be sent through B and 20 would be sent through C. The frames could be sent through a parallel process or round robin.

Security aspects will now be described. The described system can be classified as H-SDN (Hidden Software Defined Network). As the network is topology is defined purely through software and logic, it would fall under the SDN categorization. Considering any node is directly connected to, at most two other nodes (master and slave), the node cannot know about any other nodes which are part of any connection. This adds a layer of security and privacy, even if the network within a single node is compromised. For additional security, an encryption layer can be added for all data traversing the network using any modern standard.

Decentralization and redundancy aspects will now be described. An exemplary network, in accordance with various embodiments, is decentralized. It is made up of two-node segments. While the data might be relayed from a node to the end-point through 10 nodes, for example, the nodes do not have visibility to the other used in the data transmission. This allows the network to be resilient with no single point of failure. Furthermore, any node, even when actively relaying data, could fail at any moment; the rest of the nodes (primarily the ones set up as 'slave' to the failing node), will redirect the data (frame) either through other routes or simply attempt to find an alternative master node. The predictive aspect of the logic, allows all nodes to preemptively adjust their routes even before a target node is out-of-range, at risk of disconnect, etc.

Numbered List of Exemplary Method Embodiments

Method Embodiment 1 A method of operating a first communications device, the method comprising: scanning (206), at the first communications device, (e.g., checking received signals for network identifiers such as ESSIDs transmitted by wireless access points) for wireless networks; identifying (208) at the first communications device, one or more available access points based on wireless network identifiers (e.g., ESSIDs (Extended Service Set Identifiers) received during said scanning, said identified access points including a first access point; and prioritizing (210), at the first communications device, individual identified access points, said step prioritizing individual access points including prioritizing the first access point based on signal strength of a signal received from the first access point and one or more of: i) whether the first access point is a fixed or mobile wireless access point or ii) first access point motion information.

Method Embodiment 2 The method of Method Embodiment 1, further comprising: selecting (214) one or more of the prioritized access points to connect to based on the determined priority of the access points; and establishing (216) (e.g., connecting) connections with the selected one or more access points.

Method Embodiment 3 The method of Method Embodiment 2, further comprising: determining (314) that the first communications device is operating as a stationary communications device; and wherein prioritizing (210) individual identified access points includes prioritizing (322) stationary access points as having a higher priority than mobile access points.

Method Embodiment 4 The method of Method Embodiment 3, further comprising: checking (318) stored information to determine if any of the identified access points are stationary access points.

Method Embodiment 5 The method of Method Embodiment 2, further comprising: determining (316) a velocity vector for the first communications device.

Method Embodiment 6 The method of Method Embodiment 5, further comprising: determining (329) a velocity vector corresponding to the first access point.

Method Embodiment 7 The method of Method Embodiment 6, wherein prioritizing (210) individual identified access points includes: comparing (330) the velocity vector of the first communications device to the velocity vector corresponding to the first access point.

Method Embodiment 8 The method of Method Embodiment 7, further comprising: determining (254) if a scan for wireless networks should be initiated based on at least one of i) loss of a connection or ii) a determination that a connection loss is likely to occur in the near future (e.g., within a few seconds or less than a minute).

Method Embodiment 9 The method of Method Embodiment 8, wherein said determination that a connection loss is likely to occur in the near future is based on an amount of difference between the velocity vector of the first communications device and the velocity vector corresponding to the first access point.

Method Embodiment 10 The method of Method Embodiment 1, wherein said first communications device is a mobile communications device; wherein said first communications device is a client device with respect to a second mobile communications device operating as an access point (master); wherein the first communications device operates as an access point (master) with respect to a third mobile communications device (client); and wherein said first, second and third communications devices are travelling in the same direction (e.g., based on comparison of directions of velocity vector pairs (1st/2nd and 1st/3rd)-differences in direction being below a predetermined threshold).

Numbered List of Exemplary Apparatus Embodiments

Apparatus Embodiment 1 A first communications device (500) comprising: a processor (502) configured to: operate the first communications device to scan (206), at the first communications device, (e.g., checking received signals for network identifiers such as ESSIDs transmitted by wireless access points) for wireless networks; identify (208) at the first communications device, one or more available access points based on wireless network identifiers (e.g., ESSIDs (Extended Service Set Identifiers) received during said scanning, said identified access points including a first access point; and prioritize (210), at the first communications device, individual identified access points, said step prioritizing individual access points including prioritizing the first access point based on signal strength of a signal received from the first access point and one or more of: i) whether the first access point is a fixed or mobile wireless access point or ii) first access point motion information.

Apparatus Embodiment 2 The first communications device of Apparatus Embodiment 1, further wherein said processor is further configured to: select (214) one or more of the prioritized access points to connect to based on the determined priority of the access points; and establish (216) (e.g., connecting) connections with the selected one or more access points.

Apparatus Embodiment 3 The first communications device of Apparatus Embodiment 2, wherein said processor is further configured to: determine (314) that the first communications device is operating as a stationary communications device; and wherein prioritizing (210) individual identified access points includes prioritizing (322) stationary access points as having a higher priority than mobile access points.

Apparatus Embodiment 4 The first communications device of Apparatus Embodiment 3, wherein said processor is further configured to: check (318) stored information to determine if any of the identified access points are stationary access points.

Apparatus Embodiment 5 The first communications device of Apparatus Embodiment 2, wherein said processor is further configured to: determine (316) a velocity vector for the first communications device.

Apparatus Embodiment 6 The first communications device of Apparatus Embodiment 5, wherein said processor is further configured to: determine (329) a velocity vector corresponding to the first access point.

Apparatus Embodiment 7 The first communications device of Apparatus Embodiment 6, said processor is configured to: compare (330) the velocity vector of the first communications device to the velocity vector corresponding to the first access point, as part of being configured to prioritize (210) individual identified access points.

Apparatus Embodiment 8 The first communications device of Apparatus Embodiment 7, wherein said processor is further configured to: determine (254) if a scan for wireless networks should be initiated based on at least one of i) loss of a connection or ii) a determination that a connection loss is likely to occur in the near future (e.g., within a few seconds or less than a minute).

Apparatus Embodiment 9 The first communications device of Apparatus Embodiment 8, wherein said determination that a connection loss is likely to occur in the near future is based on an amount of difference between the velocity vector of the first communications device and the velocity vector corresponding to the first access point.

Numbered List of Exemplary Non-Transitory

Computer Readable Medium Embodiments

Non-Transitory Computer Readable Medium Embodiment 1 A non-transitory computer readable medium (516) including computer executable instructions which when executed by a processor (502) of a first communications device (500) cause the first communications device (500) to perform the steps of: scanning (206), at the first communications device, (e.g., checking received signals for network identifiers such as ESSIDs transmitted by wireless access points) for wireless networks; identifying (208) at the first communications device, one or more available access points based on wireless network identifiers (e.g., ESSIDs (Extended Service Set Identifiers) received during said scanning, said identified access points including a first access point; and prioritizing (210), at the first communications device, individual identified access points, said step prioritizing individual access points including prioritizing the first access point based on signal strength of a signal received from the first access point and one or more of: i) whether the first access point is a fixed or mobile wireless access point or ii) first access point motion information.

The techniques of various embodiments may be implemented using software, hardware and/or a combination of software and hardware. Various embodiments are directed to apparatus, e.g., mobile wireless communications devices, e.g. mobile wireless communications devices such as a vehicle including cellular and WiFi communications capabilities and supporting mesh network functionality, user devices such as a user equipment (UE) device, stationary and mobile WiFi access points, base stations such as a gNB or ng-eNB, cellular base stations, network nodes, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating a mobile wireless communications device supporting cellular communications, WiFi communications and mesh network functionality, user devices, base stations, e.g., cellular base station, stationary and mobile WiFi access points, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium. It should be appreciated that the methods and apparatus are not limited to WiFi and can be implemented using one or more other wireless communications standards and/or technologies.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a mobile wireless communications device supporting cellular communications, WiFi communications and mesh network functionality, a mobile WiFi access point, a controller or other device described in the present application. In some embodiments, the mobile wireless communications device is a vehicle or is part of a vehicle. In some embodiments, the mobile WiFi access point is a vehicle or is part of a vehicle. In some embodiments components are implemented as hardware devices in such embodiments the components are hardware components. In other embodiments components may be implemented as software, e.g., a set of processor or computer executable instructions. Depending on the embodiment the components maybe all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method, the method comprising:
    scanning, at a first communications device located in a vehicle, for wireless networks;
    using a steering wheel position sensor to detect turn information relating to a turn of the vehicle in which the first communications device is located;
    operating a processor in the vehicle to:
        identify one or more available access points based on wireless network identifiers received during said scanning, said identified access points including a first access point;
        prioritize individual identified access points, said step of prioritizing individual access points including prioritizing the first access point based on signal strength of a signal received from the first access point and one or more of: i) whether the first access point is a fixed or mobile wireless access point or ii) first access point motion information;
        determine based on the detected turn information, that a connection with an access point is likely to be lost in the near future; and
        control the first communications device to perform a scan for wireless networks in response to determining that the connection with said access point is likely to be lost in the near future.

2. The method of claim 1, wherein said turn information includes turn direction information and information about the severity of a detected turn, the method further comprising:
    distinguishing between a lane change and a turn onto another road based on the turn information detected by the steering wheel position sensor.

3. The method of claim 1, further comprising:
    selecting one or more of the prioritized access points to connect to based on the determined priority of the access points;
    establishing connections with the selected one or more access points.

4. The method of claim 1, wherein said first communications device is a mobile communications device;
    wherein said first communications device is a client device with respect to a second mobile communications device operating as said access point;
    wherein the first communications device operates as an access point with respect to a third mobile communications device; and
    wherein said first and third communications devices are travelling in the same direction.

5. A system comprising:
    a processor included in a vehicle configured to:
        operate a first communications device in the vehicle to scan for wireless networks;
        use a steering wheel position sensor to detect turn information relating to a turn of the vehicle in which the first communications device is located;
        identify one or more available access points based on wireless network identifiers received during said scanning, said identified access points including a first access point;
        prioritize individual identified access points, said step prioritizing individual access points including prioritizing the first access point based on signal strength of a signal received from the first access point and one or more of: i) whether the first access point is a fixed or mobile wireless access point or ii) first access point motion information;
        determine, based on the detected turn information, that a connection with an access point is likely to be lost in the near future; and
        control the first communications device to perform a scan for wireless networks in response to determining that the connection with said access point is likely to be lost in the near future.

6. The system of claim 5, wherein said processor is further configured to:
    select one or more of the prioritized access points to connect to based on the determined priority of the access points; and
    establish connections with the selected one or more access points.

7. The system of claim 6, wherein said processor is further configured to:
  determine a velocity vector for the first communications device.

8. The system of claim 7, wherein said processor is further configured to:
  determine a velocity vector corresponding to the first access point.

9. The system of claim 8, wherein said processor is further configured to:
  compare the velocity vector of the first communications device to the velocity vector corresponding to the first access point, as part of being configured to prioritize individual identified access points.

10. A non-transitory computer readable medium including computer executable instructions which when executed by a processor of a vehicle control the processor to:
  control a first communications device located in the vehicle to scan for wireless networks;
  use a steering wheel position sensor to detect turn information relating to a turn of the vehicle in which the first communications device is located;
  identify one or more available access points based on wireless network identifiers received during said scanning, said identified access points including a first access point;
  prioritize individual identified access points, said step of prioritizing individual access points including prioritizing the first access point based on signal strength of a signal received from the first access point and one or more of: i) whether the first access point is a fixed or mobile wireless access point or ii) first access point motion information; and
  determine based on the detected turn information, that a connection with an access point is likely to be lost in the near future; and
  control the first communications device to scan for wireless networks in response to determining that the connection with said access point is likely to be lost in the near future.

11. The method of claim 1, further comprising:
  establishing a new connection with another access point prior to losing the connection with said access point.

12. The method of claim 1, further comprising:
  receiving from said access point a message providing access point route information indicating an expected change in a route of said access point; and
  transmitting a message from the first communications device indicating an expected change in direction due to a planned turn by the first communications device.

13. The method of claim 12, wherein determining that a connection with said access point is likely to be lost in the near future includes:
  determining, from the access point route information and information about a route of the first communications device, that a turn by one of said access point and the first communications device but not the other is likely to result in loss of the connection with said access point.

14. The method of claim 13, further comprising:
  determining the route of the first communications device from a route or destination that was entered into i) a vehicle guidance system, ii) a navigation system or iii) both a vehicle guidance system and a navigation system.

15. The method of claim 13, wherein the near future is a time period less than a minute.

16. The system of claim 5, wherein said processor is further configured to:
  establish a new connection with another access point prior to losing the connection with said access point.

17. The system of claim 5, wherein said processor is further configured to control the first communications device to:
  receive from said access point a message providing access point route information indicating an expected change in a route of said access point.

18. The system of claim 7, wherein said processor is further configured to control the first communications device, as part determining if a connection with said access point is likely to be lost in the near future, to:
  determine, from the access point route information and information about a route of the first communications device, that a turn by one of said access point and the first communications device but not the other is likely to result in loss of the connection with said access point.

19. The system of claim 18, wherein said processor is further configured to control the first communications device to:
  determine the route of the first communications device from a route or destination that was entered into i) a vehicle guidance system, ii) a navigation system or iii) both a vehicle guidance system and a navigation system.

20. The system of claim 18, wherein the near future is a time period less than a minute.

* * * * *